US011810080B2

(12) United States Patent
Lin et al.

(10) Patent No.: US 11,810,080 B2
(45) Date of Patent: *Nov. 7, 2023

(54) SYSTEMS AND METHOD FOR TRACKING ENTERPRISE EVENTS USING HYBRID PUBLIC-PRIVATE BLOCKCHAIN LEDGERS

(71) Applicant: The Toronto-Dominion Bank, Toronto (CA)

(72) Inventors: Jenny Lin, Mississauga (CA); Perry Aaron Jones Haldenby, Toronto (CA); John Jong Suk Lee, Waterloo (CA); Paul Mon-Wah Chan, Markham (CA); Orin Del Vecchio, Richmond Hill (CA)

(73) Assignee: The Toronto-Dominion Bank, Toronto (CA)

(*) Notice: Subject to any disclaimer, the term of this patent is extended or adjusted under 35 U.S.C. 154(b) by 603 days.

This patent is subject to a terminal disclaimer.

(21) Appl. No.: 16/519,122

(22) Filed: Jul. 23, 2019

(65) Prior Publication Data
US 2019/0347627 A1    Nov. 14, 2019

Related U.S. Application Data

(63) Continuation of application No. 14/928,838, filed on Oct. 30, 2015, now Pat. No. 10,402,792.
(Continued)

(51) Int. Cl.
*G06Q 20/06* (2012.01)
*G06Q 30/0214* (2023.01)
(Continued)

(52) U.S. Cl.
CPC ......... *G06Q 20/0655* (2013.01); *G06F 21/62* (2013.01); *G06F 21/645* (2013.01);
(Continued)

(58) Field of Classification Search
CPC ...... G06Q 10/00–30; G06Q 20/00–425; H04L 9/00–50; G06F 21/00–88
See application file for complete search history.

(56) References Cited

U.S. PATENT DOCUMENTS 5,892,900 A * 4/1999 Ginter .................... G06Q 20/12
726/26
6,363,481 B1 * 3/2002 Hardjono ................ H04L 9/085
713/165

(Continued)

FOREIGN PATENT DOCUMENTS

| EP | 1693804 | 8/2006 |
| WO | WO 2001/029777 | 4/2001 |
| WO | WO 2013/112642 A1 | 8/2013 |

OTHER PUBLICATIONS

Yaga, NIST.IR.8202 (Year: 2018).*

(Continued)

*Primary Examiner* — Mohammad A. Nilforoush
(74) *Attorney, Agent, or Firm* — Duane Morris LLP

(57) ABSTRACT

The disclosed embodiments include computerized systems and methods for generating secured blockchain-based ledger data structures that track occurrences of events across fragmented and geographically dispersed lines-of-business of an enterprise. In one instance, an apparatus associated with a rules authority of the secured blockchain-based ledger may detect an occurrence of a triggering event, and may access and decrypt a set of rules hashed into the secured blockchain-based ledger using a confidentially-held master cryptographic key. The apparatus may identify a rule associated with the detected event, and perform one or more operations consistent with the rule, including a disbursement of various rewards to employees in response to customer-specific interactions with the enterprise. The disclosed embodiments provide a rules process for aggregating mutually incompat- (Continued)

ible enterprise data that specifies the events, and for tracking the events in uniform data structures accessible across the enterprise.

19 Claims, 6 Drawing Sheets

Related U.S. Application Data

(60) Provisional application No. 62/204,768, filed on Aug. 13, 2015.

(51) Int. Cl.

| | | |
|---|---|---|
| G06F 21/64 | (2013.01) | |
| H04N 5/913 | (2006.01) | |
| G06Q 20/36 | (2012.01) | |
| G06Q 10/0631 | (2023.01) | |
| G06Q 10/10 | (2023.01) | |
| G06Q 10/1093 | (2023.01) | |
| G06Q 50/08 | (2012.01) | |
| G06Q 20/10 | (2012.01) | |
| G06Q 20/40 | (2012.01) | |
| G06F 21/62 | (2013.01) | |
| H04L 9/08 | (2006.01) | |
| G06Q 50/18 | (2012.01) | |
| H04L 9/32 | (2006.01) | |
| H04L 9/40 | (2022.01) | |
| G06Q 10/08 | (2023.01) | |
| G06Q 40/12 | (2023.01) | |
| G06Q 40/08 | (2012.01) | |
| G06Q 20/38 | (2012.01) | |
| H04L 9/00 | (2022.01) | |

(52) U.S. Cl.
CPC . *G06Q 10/0631* (2013.01); *G06Q 10/063114* (2013.01); *G06Q 10/08* (2013.01); *G06Q 10/103* (2013.01); *G06Q 10/1097* (2013.01); *G06Q 20/065* (2013.01); *G06Q 20/102* (2013.01); *G06Q 20/367* (2013.01); *G06Q 20/3829* (2013.01); *G06Q 20/401* (2013.01); *G06Q 20/405* (2013.01); *G06Q 20/4016* (2013.01); *G06Q 30/0214* (2013.01); *G06Q 40/08* (2013.01); *G06Q 40/128* (2013.12); *G06Q 50/08* (2013.01); *G06Q 50/18* (2013.01); *H04L 9/0816* (2013.01); *H04L 9/0861* (2013.01); *H04L 9/0891* (2013.01); *H04L 9/0894* (2013.01); *H04L 9/3247* (2013.01); *H04L 63/061* (2013.01); *H04L 63/062* (2013.01); *H04L 63/0876* (2013.01); *H04N 5/913* (2013.01); *G06Q 2220/00* (2013.01); *G06Q 2220/10* (2013.01); *G06Q 2230/00* (2013.01); *H04L 9/50* (2022.05); *H04L 63/0435* (2013.01); *H04L 63/0442* (2013.01); *H04L 63/08* (2013.01); *H04L 63/12* (2013.01); *H04L 2209/24* (2013.01); *H04L 2209/56* (2013.01); *H04N 2005/91342* (2013.01); *Y02P 90/08* (2015.11); *Y04S 10/50* (2013.01)

(56) References Cited

U.S. PATENT DOCUMENTS

| | | | |
|---|---|---|---|
| 7,194,543 B2 | 3/2007 | Corneille et al. | |
| 7,324,976 B2 | 1/2008 | Gupta et al. | |
| 7,703,140 B2 | 8/2010 | Nath et al. | |
| 8,135,134 B2 | 3/2012 | Orsini et al. | |
| 8,150,769 B2 | 4/2012 | Gupta et al. | |
| 8,223,972 B2 * | 7/2012 | Ito | H04L 9/088 380/277 |
| 8,327,138 B2 | 12/2012 | Nath et al. | |
| 8,347,088 B2 | 1/2013 | Moore et al. | |
| 8,651,375 B1 | 2/2014 | Gouldd et al. | |
| 9,014,661 B2 | 4/2015 | DeCharms | |
| 9,436,923 B1 * | 9/2016 | Sriram | G06Q 10/0833 |
| 10,541,811 B2 * | 1/2020 | Peddada | H04L 9/0861 |
| 2002/0111907 A1 | 8/2002 | Ling | |
| 2002/0128917 A1 | 9/2002 | Grounds | |
| 2003/0074264 A1 * | 4/2003 | Hoffman | G06Q 30/0609 705/7.36 |
| 2003/0126079 A1 | 7/2003 | Roberson et al. | |
| 2005/0024201 A1 | 2/2005 | Culpepper et al. | |
| 2005/0091173 A1 | 4/2005 | Alve | |
| 2006/0242038 A1 | 10/2006 | Giudilli | |
| 2007/0046689 A1 | 3/2007 | Tokimoto et al. | |
| 2011/0106685 A1 | 5/2011 | Silbert | |
| 2014/0005809 A1 | 1/2014 | Frei et al. | |
| 2014/0344015 A1 | 11/2014 | Puértolas-Montañés | |
| 2015/0046337 A1 | 2/2015 | Hu et al. | |
| 2015/0081566 A1 | 3/2015 | Slepinin | |
| 2015/0128240 A1 | 5/2015 | Richards et al. | |
| 2015/0220892 A1 | 8/2015 | Allen | |
| 2015/0371548 A1 | 12/2015 | Samid | |
| 2016/0065540 A1 | 3/2016 | Androulaki et al. | |
| 2016/0162897 A1 | 6/2016 | Feeney | |
| 2016/0210626 A1 | 7/2016 | Ortiz | |
| 2016/0253663 A1 | 9/2016 | Clark | |
| 2016/0259937 A1 | 9/2016 | Ford et al. | |
| 2016/0292680 A1 | 10/2016 | Wilson, Jr. | |
| 2016/0306982 A1 | 10/2016 | Seger et al. | |
| 2016/0342989 A1 | 11/2016 | Davis | |
| 2016/0358165 A1 | 12/2016 | Maxwell | |
| 2017/0177898 A1 | 6/2017 | Dillenberger | |

OTHER PUBLICATIONS

Molina et al., Database Systems The Complete Book (Year: 2009).*
Herbert et al., "A novel method for decentralized peer-to-peer software license validation using cryptocurrency blockchain technology," Proceedings of the 38th Australian Computer Science Conference, Jan. 27-30, 2015, (8 pages).
Danezis et al., "Centrally banked cryptocurrencies," May 26, 2015 (13 pages).
"Open-source Internet of Things Micropayment Processing Hits the Market," Bitcointalk.org, Jul. 2015, retrieved from https://bitcointalk.org/index.php?topic=854280;imode on Sep. 30, 2016 (3 pages).
"How it Works," retrieved from https://toronto.car2go.com/how-it-works/ on Sep. 30, 2016 (8 pages).
Karame et al., "Pay as you Browse: Microcomputations as Micropayments in Web-based Services," Proceedings of WWW 2011—Session: E-commerce, Mar. 28-Apr. 1, 2011, pp. 307-316.
Ectors, M., "Five new businesses for Telefonica Digital," Sep. 21, 2011, retrieved from https://telruptive.com/tag/micro-payment on Sep. 30, 2016 (1 page).
Dawson, R., "The new layer of the economy enabled by M2M payments in the Internet of Things," Sep. 16, 2014, retrieved from http://rossdawsonblog.com/weblog/archives/2014/09/new-layer-economy-enabled-m2m-payments-internet-things.html on Sep. 30, 2016 (7 pages).
Noyen et al., "When money learns to fly: towards sensing as a service applications using bitcoin," Sep. 20, 2014 (6 pages).

* cited by examiner

Customer: "User 106"

| Transaction Number | Time Stamp | Activity Entry | Source | Target | Actual Value | Lead Value |
|---|---|---|---|---|---|---|
| 1 | 15:01 - 11/10/14 | Schedule appointment with loan offer at physical branch | Easyweb | Loan Officer | - | $500K |
| 2 | 15:00 - 11/11/14 | Acquired mortgage for $800K | Loan Officer | Residential Lending Unit | $800K | ($500K) |
| 3 | 16:01 - 11/11/14 | Branch identified need for wealth management services | Branch CSR | Wealth FSR | - | $400K |
| 4 | 11:30 - 2/05/15 | $1MM transfer to Wealth | Wealth FSR | Wealth | $1MM | ($400K) |
| 5 | 16:01 - 11/11/14 | Branch identified need for commercial banking services | Branch CSR | Commercial Banking FSR | - | $500K |
| 6 | 13:45 - 12/5/14 | Open $500K line-of-credit | Commercial Banking FSR | Commercial Banking FSR | $500K | ($500K) |

FIG. 5

SYSTEMS AND METHOD FOR TRACKING ENTERPRISE EVENTS USING HYBRID PUBLIC-PRIVATE BLOCKCHAIN LEDGERS

CROSS-REFERENCE TO RELATED APPLICATIONS

This application is a continuation of, and claims the benefit of priority to, U.S. application Ser. No. 14/928,838, filed Oct. 30, 2015, which claims the benefit of U.S. Provisional Patent Application No. 62/204,768, filed Aug. 13, 2015. The disclosures of these applications are expressly incorporated by reference herein to-their entireties.

DESCRIPTION

Technical Field

The disclosed embodiments generally relate to computerized systems and methods for securing data, and more particularly, and without limitation, computerized systems and methods that generate secured blockchain-based ledger structures.

Background

Modern commercial enterprises, such as financial institutions, multinational corporations, and law firms, often link together multiple, fragmented, and geographically dispersed business units and lines-of-business. Although operating within a common enterprise, the fragmented nature of these distinct business units and lines-of-business renders complex any attempt to accurately identify and capture the various points of customer interaction across the enterprise. Further, devices operating within these fragmented and geographically dispersed business units and lines-of-business often execute various and often mutually-incompatible software applications (with corresponding mutually-incompatible data inputs and outputs), which often prevents the timely aggregation of data captured across the enterprise devices and the dissemination of the aggregated data within the enterprise. The lack of business-unit and line-of-business integration may lead to an environment characterized by incoherent customer management, which may prevent conventional database architectures from tracking and quantifying occurrences of enterprise-specific events, such as cross-line-of-business referrals and cross-line-of-business interactions.

SUMMARY

The disclosed embodiments relate to computerized systems and methods that generate secured blockchain-based ledger structures tracking occurrences of events across fragmented and geographically dispersed enterprises.

In one embodiment, an apparatus includes at least one processor and a memory storing executable instructions that, when executed by the at least one processor, causes the at least one processor to perform the steps of accessing data corresponding to at least one blockchain ledger and detecting an occurrence of an event within the blockchain ledger data. The executed instructions may further cause the at least one processor to perform the step of decrypting (i) a first encrypted portion of the blockchain ledger data using a first cryptographic key and (ii) a second encrypted portion of the blockchain ledger data using a second cryptographic key. In certain aspects, the decrypted first data portion may identify a plurality of triggering events, and the decrypted second data portion may identify a plurality of rules associated with a rules authority. The executed instructions may further cause the at least one processor to perform the step of determining, based on the decrypted first data portion, that the detected event corresponds to at least one of the triggering events. In response to the determination, the executed instructions may further cause the at least one processor to perform the steps of identifying, based on the detected second data portion, at least one of the one or more rules that exhibits a causal relationship with the detected event, and generating an electronic command to perform one or more operations consistent with the at least one identified rule.

In further embodiments, a computer-implemented method may include accessing, using at least one processor, data corresponding to at least one blockchain ledger, and detecting, using the at least one processor, an occurrence of an event within the blockchain ledger data. The method may also include, using the at least one processor, decrypting (i) a first encrypted portion of the blockchain ledger data using a first cryptographic key and (ii) a second encrypted portion of the blockchain ledger data using a second cryptographic key. In certain aspects, the decrypted first data portion may identify a plurality of triggering events, and the decrypted second data portion may identify a plurality of rules associated with a rules authority. The method may also include, based on the decrypted first data portion, determining, using the at least one processor, that the detected event corresponds to at least one of the triggering events. In response to the determination, the method may further include identifying, using the at least one processor, and based on the detected second data portion, at least one of the one or more rules that exhibits a causal relationship with the detected event, and generating, using the at least one processor, an electronic command to perform one or more operations consistent with the at least one identified rule.

In other embodiments, a tangible, non-transitory computer-readable medium may store instructions that, when executed by at least one processor, perform a method. The method may include accessing data corresponding to at least one blockchain ledger, and detecting an occurrence of an event within the blockchain ledger data. The method may also include decrypting (i) a first encrypted portion of the blockchain ledger data using a first cryptographic key and (ii) a second encrypted portion of the blockchain ledger data using a second cryptographic key. In certain aspects, the decrypted first data portion may identify a plurality of triggering events, and the decrypted second data portion may identify a plurality of rules associated with a rules authority. The method may also include, based on the decrypted first data portion, determining that the detected event corresponds to at least one of the triggering events. In response to the determination, the method may further include identifying, based on the detected second data portion, at least one of the one or more rules that exhibits a causal relationship with the detected event, and generating an electronic command to perform one or more operations consistent with the at least one identified rule.

It is to be understood that both the foregoing general description and the following detailed description are exemplary and explanatory only, and are not restrictive of the disclosed embodiments as claimed. Further, the accompanying drawings, which are incorporated in and constitute a part of this specification, illustrate aspects of the present disclosure and together with the description, serve to explain principles of the disclosed embodiments as set forth in the accompanying claims

BRIEF DESCRIPTION OF THE DRAWINGS

FIG. 5 is a diagram of an exemplary customer-specific accounting ledger, consistent with disclosed embodiments.

DETAILED DESCRIPTION

Figure 1:
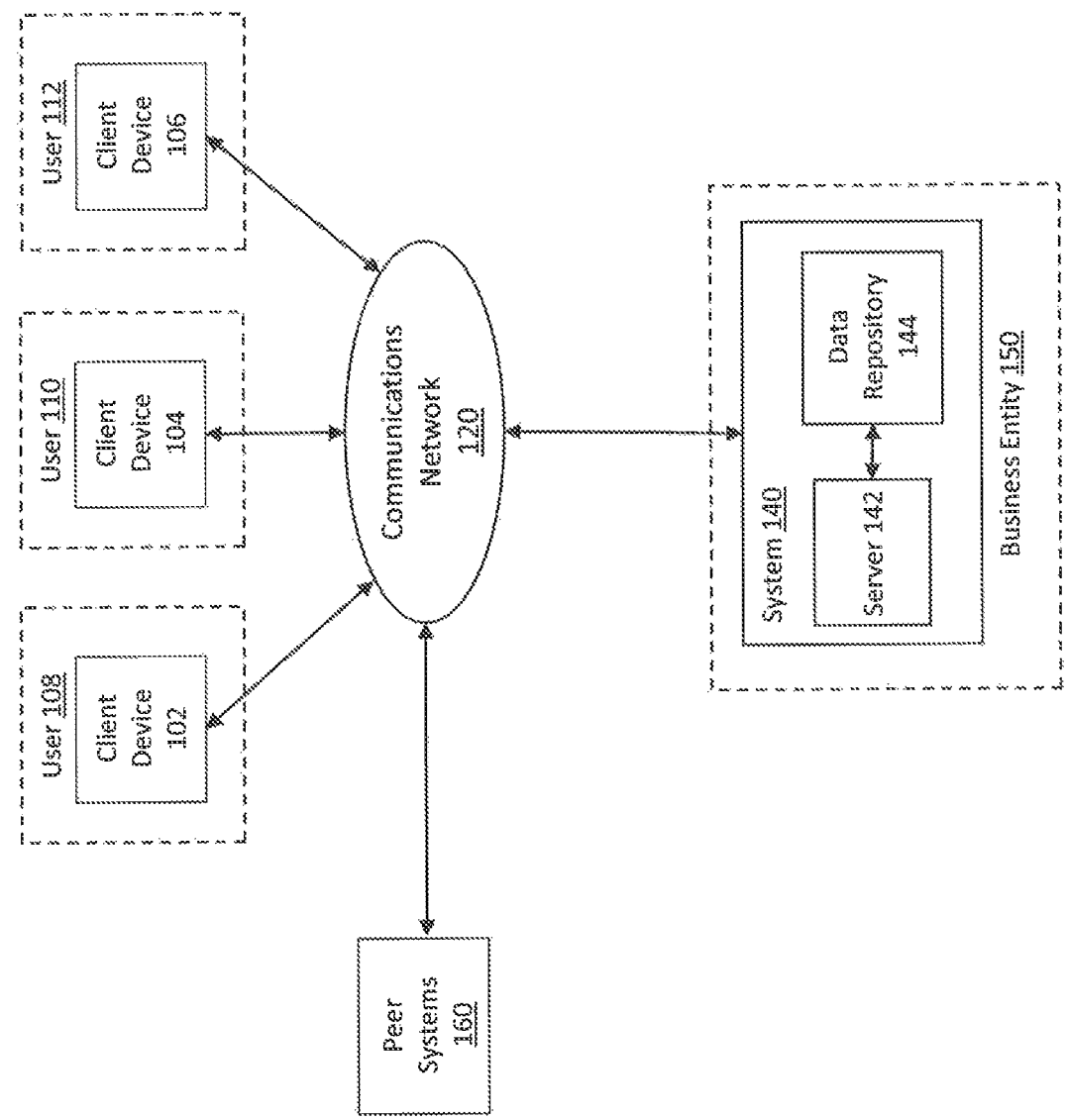
FIG. 1 is a diagram of an exemplary computing environment, consistent with disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

I. Exemplary Computing Environments, Networks, Systems, and Devices

FIG. 1 illustrates an exemplary computing environment 100 consistent with certain disclosed embodiments. In one aspect, computing environment 100 may include client devices 102, 104, and 106, system 140, peer systems 160, and a communications network 120 connecting one or more of the components of environment 100.

Consistent with the disclosed embodiments, one or more of the components of computing environment 100 may be configured to address problems inherent to conventional blockchain-based ledgers by embedding a private-master encryption key architecture into a conventional blockchain architecture (e.g., a blockchain-based architecture associated with the public Bitcoin™ ledger). In some aspects, the resulting hybrid blockchain architecture may facilitate a selective encryption of information by client devices 102, 104, and 106, system 140, and/or peer systems 160, thus providing a technical solution that protects sensitive and/or confidential instructions sets and event triggers and corresponding confidential instructions sets.

a. Exemplary Client Devices

In one embodiment, client devices 102, 104, and/or 106 may include a computing device, such as, but not limited to, a hashing computer, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on a display device(s), consistent with disclosed embodiments. In certain embodiments, at least one of client devices 102, 104, and/or 106 may be associated with one or more users, such as users 108, 110, and/or 112. For instance, user 110 may operate client device 104 and may do so to cause client device 104 to perform one or more operations consistent with the disclosed embodiments.

Client devices 102, 104, and/or 106 may include one or more tangible, non-transitory memories that store data and/or software instructions, and one or more processors configured to execute software instructions. Client devices 102, 104, and/or 106 may include one or more display devices that display information to a user and one or more input device(s) to allow the user to input information to client device 102, 104, and/or 106 (e.g., keypad, keyboard, touchscreen, voice activated control technologies, or any other type of known input device).

In one aspect, client devices 102, 104, and/or 106 may store in memory one or more software applications that run on client device 104 and are executed by the one or more processors. In some instances, client device 104 may store software applications that, when executed by one or more processors, perform operations that establish communications with one or more of peer systems 160 (e.g., across network 120) and that obtain, from peer systems 160, a current version of a hybrid blockchain ledger generated and maintained in accordance with the disclosed embodiments.

In other instances, and as described below, one or more of client devices 102, 104, and/or 106 may execute the one or more stored software application and to obtain data from the hybrid blockchain ledger that includes, but not limited to, data identifying one or more tracked assets, and/or a public key of one or more users. Further, and as described below, the one or more executed software applications may cause client devices 102, 104, and/or 106 to extract, from the one or more accessed blocks, a copy of an encrypted and/or hashed ownership/rules portion of the transaction block (e.g., including the identification a holder of a master key) and/or a copy of an encrypted and/or hashed master data block (e.g., encrypted using the master key and including rules permitting preconfigured and/or actions involving the tracked assets). In additional instances, and as further described below, client devices 102, 104, and/or 106 may provide information associated with one or more actions or transactions involving the tracked assets (e.g., information identifying the actions or transaction, information identifying the assets, a public key, a digital signature, etc.) to peer systems 160, along with copies of the encrypted and/or hashed rules engines and lists of triggering events.

In some aspects, the one or more stored applications may include a wallet application provided by business entity 150 (e.g., a mobile wallet application or an application executable on a desktop computer) and capable of initiating transactions denominated in one or more currencies, including virtual currencies such as Bitcoin™.

b. Exemplary Computer Systems

System 140 may be a computing system configured to execute software instructions to perform one or more operations consistent with disclosed embodiments. In one aspect, system 140 may be associated with a business entity 150 (e.g., a financial institution) that provides financial accounts, financial services transactions, and investment services one or more users (e.g., customers of the business entity 150). In some aspects, system 140 may be a distributed system that may include computing components distributed across one or more networks, such as network 120, or other networks.

In one aspect, system 140 may include computing components configured to store, maintain, and generate data and software instructions. For example, system 140 may include one or more servers (e.g., server 142) and tangible, non-transitory memory devices (e.g., data repository 144). Server 142 may include one or more computing devices that may be configured to execute software instructions to perform one or more processes consistent with the disclosed embodiments. In one example, server 142 may be a computing device that executes software instructions that perform operations that provides information to one or more other components of computing environment 100.

In one embodiment, server 142 may include a computer (e.g., a personal computer, network computer, or mainframe computer) having one or more processors that may be selectively activated or reconfigured by a computer program. In one aspect, server 142 (or other computing components of system 140) may be configured to provide one or more websites, digital portals, etc., that provide services consistent with business entity 150, such as a digital banking or investment portal, and services consistent with disclosed embodiments. For instance, server 142 may be configured to provide information associated with a requested web page over communications network 120 to client device 104, which may render the received information and present content from the web page on a display device, e.g., a touchscreen display unit.

In other aspects, server 142 (or other computing components of system 140) may be configured to provide information to one or more application programs executed by client device 104 (e.g., through a corresponding application programming interface (API)). For example, client device 104 may execute an application program associated with and provided by business entity 150, such a mobile banking application and/or a mobile wallet application, to provide services consistent with the disclosed embodiments. In some instances, server 142 may provide information to client devices 102, 104, and/or 106 (e.g., through the API associated with the executed application program), and client devices 102, 104, and/or 106 may be configured by the executed application program to present portions of the information to corresponding users through a corresponding graphical user interface (GUI).

In further aspects, server 142 (or other computing components of system 140) may be configured to provide to client devices 102, 104, and/or 106 (and/or receive from client device 104) information associated with services provided by business entity 150. For example, client device 104 may receive the transmitted information, and store portions of the information in locally accessible storage device and/or network-accessible storage devices and data repositories (e.g., cloud-based storage). In one instance, client device 104 may execute stored instructions (e.g., an application program, a web browser, a mobile banking application, and/or a mobile wallet application) to process portions of the stored data and render portions of the stored data for presentation to user 110. Additionally, server 142 may be incorporated as a corresponding node in a distributed network, and additionally or alternatively, as a corresponding networked server in a cloud-computing environment.

Furthermore, server 142 may communicate via network 120 with one or more additional servers (not shown), which may facilitate the distribution of processes for parallel execution by the additional servers.

In further aspects, business entity 150 may represent a "controlling entity" capable of regulating transactions assets (e.g., units of virtual currency, units of various financial instruments, physical assets, etc.) tracked within hybrid public-private ledgers consistent with the disclosed embodiments. By way of example, one or more computing components of system 140 (e.g., server 142) may be configured (e.g., by executed software instructions) to establish one or more rules that regulate a distributions of and/or transactions associated with the tracked assets, an initiation of transfers of the tracked assets (e.g., a sale, a use of the tracked assets as collateral in a secured transaction etc.), and further, any additional or alternate action involving the tracked assets and/or the hybrid public-private ledger (e.g., processes that generate additional cryptographic key sets for user 110, processes that recover assets tracked in the hybrid public-private ledger, etc.).

Additionally, in some aspects, system 140 may establish causal relationships between one or more of the established rules and one or more events that trigger an initiation of one or more corresponding regulated distributions, transfers, and/or other actions involving assets tracked within the hybrid public-private ledger (e.g., "triggering events"). For example, a confirmed loss of a private cryptographic key issued to user 110 may represent a triggering event that causes system 140 to verify user 110's identity, initiate a transaction of the orphaned assets, generate a new pair of public and private cryptographic keys for user 110 (i.e., public and private blockchain keys), and transmit at least the private blockchain key to user 110 through secure, non-accessible processes, in accordance with one or more of the established rules.

Further, by way of example, a theft of a portion of user 110's tracked assets (e.g., units of virtual currency specified within one of more blocks of the hybrid public-private ledger) may represent a triggering event that causes system 140 to initiate a recovery protocol to generate a transaction request to recover the value of the stolen assets (e.g., to transfer the stolen assets back to user 110), and further, to generate a new pair of public and private blockchain keys for user 110, as described above. In other instances, a death and/or incapacitation of user 110 may represent a triggering event that causes system 140 to initiate a series of transaction to distribute of at least a portion of the tracked assets (e.g., through corresponding transaction requests consistent with the disclosed embodiments) to one or more additional owners identified by user 110 and specified within corresponding ones of the identified rules.

In some aspects, system 140 may be configured to establish one or more of the rules, and further, one or more of the causal relationships and triggering events, based on internal regulations associated with business entity 150. For example, the one or more internal regulations associated with business entity 150 may specify that system 140 verify an identity of user 110 (e.g., based on various forms of multi-factor authentication data) and/or obtain specific elements of documentation (e.g., a police report, etc.) prior to initiating the lost private key protocol and/or the recovery protocols outlined above. In other aspects, system 140 may one or more of the rules and/or triggering events based on information received from user 110 (e.g., as input provided to a web page or other graphical user interface (GUI) presented by client device 104 and provided to system 140).

For example, user 110 may specify, as input to the web page or GUI presented by client device 104, one or more individuals that would receive portions of the tracked assets upon completion of one or more tasks and/or in the event of user 110's accidental death. The disclosed embodiments are, however, not limited to the exemplary triggering events and established rules described above, and in further aspects, the disclosed embodiments may be configured to generate any additional or alternate user- and system-specified rules and triggering events consistent with the hybrid public-private ledger and appropriate to the tracked assets, user 110, and/or business entity 150 (i.e., acting as a rules authority for the hybrid public-private ledger).

Further, and as outlined below, system 140 may be configured to store the one or more established rules (e.g., as a rules engine) and one or more of the established trigger events (e.g., as an event trigger list) within a portion of a local data repository (e.g., data repository 144). Additionally or alternatively, system 140 may be configured to store portions of the rules engine and/or event trigger list within a secure data repository accessible to system 140 across network 140 (e.g., cloud-based storage).

As described above, one or more computing components of system 140 (e.g., server 142) may be configured to generate pairs of public and private blockchain keys for user 110 (e.g., user 110's public/private blockchain key pair), and to provide the generated private blockchain key to user 110 through secure, non-accessible and/or out-of-band communications (e.g., by mail, etc.). In further embodiments, the one or more components of system 140 (e.g., server 142) may be configured to generate and maintain additional cryptographic keys that facilitate a generation and maintenance of portions of the hybrid public-private ledger. For instance, system 140 may be configured to generate a master key, which system 140 may leverage to encrypt the stored rules engine. In certain aspects, system 140 may store copies of the generated master key in a portion of data repository 144 that is not accessible to user 110 (and any other users), thus maintaining a confidence of the generated master key.

In additional aspects, system 140 may be configured to generate and maintain a private crypto key on behalf of user 110 (and additionally or alternatively, user 108 and 112), which system 140 may leverage to encrypt the stored event trigger list, and which may be provided to user 110 (and/or to user 108 and 112) through secure, non-accessible and/or out-of-band communications. Further, and as described above, system 140 may store copies of the private crypto keys in a portion of data repository 144.

Further, in additional embodiments, one or more computing components of system 140 (e.g., server 140) may be configured to hash the generated (and encrypted) rules engine and event trigger list into a genesis block associated with the hybrid public-private ledger. In other aspects, system 140 may provide the encrypted rules engine and event triggers list to one or more of peer system 160, which may be configured to hash the encrypted rules engine and event trigger list into the genesis block. By way of example, and by hashing the encrypted rules engine and event trigger list into the genesis block of the hybrid public-private ledger, the disclosed embodiments enable an in-band communication of the encrypted rules engine and event triggers from user to user within blocks (e.g., transactions) of the hybrid public-private ledger c. Exemplary Data Repositories and Stored Data Data repository 144 may include one or more memories that are configured to store and provide access to data and/or software instructions. Such memories may include tangible non-transitory computer-readable media that store software instructions that, when executed by one or more processors (e.g., of server 132), perform one or more operations consistent with disclosed embodiments. Data repository 144 may also be configured to store information relating to business entity 150, e.g., a financial institution.

For instance, data repository 144 may store customer data that uniquely identifies customers of a financial institution associated with system 140. By way of example, a customer of the financial institution (e.g., users 108, 110, and/or 112) may access a web page associated with system 140 (e.g., through a web server executed by a corresponding front end), and may register for digital banking services and provide data, which may be linked to corresponding ones of users 108, 110, and/or 112, and stored as customer data within data repository 144. The stored customer data may, for example, include personal information, government-issued identifiers, employment information, and contact information. The stored customer data may also include authentication credentials associated with registered users of the financial institution (e.g., a user name, a user-specified password, a system-generated password, an alphanumeric identification number (e.g., a PIN number) specified by the users or assigned by financial system 140, biometric information, and information facilitating enhanced authentication techniques).

In additional aspects, and as described above, data repository 144 may store a rules engine identifying or more rules that regulate a distribution of the tracked assets, an initiation of one or more transactions involving the tracked assets (e.g., a sale, a transfer in ownership, a use of the tracked assets as collateral in a secured transaction etc.), and further, any additional or alternate action involving the tracked assets and/or the hybrid public-private ledger (e.g., processes that generate additional cryptographic key sets for users 108, 110, and/or 112, processes that recover assets racked in the hybrid public-private ledger, etc.). Further, and as described above, data repository 144 may also store information identifying an event triggers list that identifies causal relationships established by system 140 between one or more of the established rules and one or more events that trigger an initiation of one or more corresponding regulated distributions, transactions, and/or assets tracked within the hybrid blockchain ledger (e.g., "triggering events").

In some aspects, system 140 may be configured to establish one or more of the rules, and further, one or more of the causal relationships and triggering events, based on one or more internal regulations associated with business entity 150.

In other aspects, system 140 may one or more of the rules and/or triggering events based on information received from one or more of users 108, 110, and/or 112 (e.g., as input provided to a web page or other graphical user interface (GUI) presented by client devices 102, 104, and/or 106 and provided to system 140).

In an embodiment, data repository 144 may also store a copy of a master key and private crypto keys associated with users 108, 110, and 112 (and additionally or alternatively, additional private crypto keys associated with other users). By way of example, system 140 may be configured to store the private crypto keys in a data structure that includes information that associates the private crypto keys with corresponding ones of user 108, 110, and 112, and further, may be configured to store the master key in a data structure within data repository 144 that is inaccessible to users 108, 110, and/or 112 (and additionally or alternatively, to other users). Further, in some aspects, data repository 144 may be configured to store the rules engine and/or event triggers list in raw, unencrypted form. In other aspects, consistent with the disclosed embodiments, data repository 144 may be configured to store the rules engine and/or event triggers in encrypted form (e.g., using the stored master key), and/or store a hashed representation of the rules engine and/or the event triggers list.

d. Exemplary Communications Networks

Communications network 120 may include one or more communication networks or medium of digital data communication. Examples of communication network 120 include a local area network ("LAN"), a wireless LAN, a RF network, a Near Field Communication (NFC) network, (e.g., a "WiFi" network), a wireless Metropolitan Area Network (MAN) connecting multiple wireless LANs, NFC communication link(s), and a wide area network ("WAN"), e.g., the Internet. Consistent with embodiments of the present disclosure, communications network 120 may include the Internet and any publicly accessible network or networks interconnected via one or more communication protocols, including, but not limited to, hypertext transfer protocol (HTTP) and transmission control protocol/internet protocol (TCP/IP). Communications protocols consistent with the disclosed embodiments also include protocols facilitating data transfer using radio frequency identification (RFID) communications and/or NFC. Moreover, communications network 120 may also include one or more mobile device networks, such as a GSM network or a PCS network, allowing client device 104 to send and receive data via applicable communications protocols, including those described herein.

e. Exemplary Peer Systems

Referring back to FIG. 1, peer systems 160 may include one or more computing systems configured to execute software instructions to perform one or more operations consistent with disclosed embodiments. In some aspects, peer systems 160 may include computing components configured to store, maintain, and generate data and software instructions. For example, each of peer systems 160 may include one or more computing devices (e.g., a server, network computer, or mainframe computer) having one or more processors that may be selectively activated or reconfigured by executable instructions (e.g., computer programs) stored in one or more tangible, non-transitory computer-readable storage devices.

In an embodiment, one or more of peer system 160 may be configured to receive, from client device 104 across network 120, information associated with a distribution of, transaction involving, or other action associated with one or more assets tracked within hybrid blockchain ledgers consistent with the disclosed embodiments. By way of example, the received information may include, but is not limited to, data identifying at least a portion of the tracked assets, data identifying a current owner of the portion of the tracked assets (e.g., user 110) (or a obfuscated owner identifier), and further, encrypted copies of and/or hash values representative of the rules engine and event triggers list.

In some aspects, the one or more of peer systems 160 may be configured (e.g., by the executed software programs) to validate the received information and to generate a new block of the hybrid blockchain ledger that includes the received information, either alone (e.g., using a "one transaction, one block" paradigm) or in combination with information identifying additional distributions, transactions, or other actions associated with one or more tracked assets (e.g., as a multiple-transaction block). The one or more peer systems 160 may be further configured to generate one or more hashes representative of the new block, which may be appended to a prior version of the hybrid private-public ledger along with the newly generated block. In some aspects, the one or more of peer system 160 may maintain the updated versions of the hybrid private-public ledger (i.e., the latest, longest hybrid private-public ledger), and may provide the updated version of the hybrid private-public ledger to client devices 102, 104, and/or 106 (and additionally or alternatively, other client devices associated with other users) upon receipt of a request across network 120 and/or at regular or predetermined intervals. In some aspects, one or more of peer systems 140.

In certain instances, and in addition to a connection with network 120, peer systems 160 may be interconnected across a peer-to-peer network (not depicted in FIG. 1) using any of the wired or wireless communications protocols outlined above. Further, in some instances, one or more of peer systems 160 may function as a "miner," where any miner may be compensated in units of a virtual currency (e.g., Bitcoin™) for validating the received data and for generating updated versions of the hybrid blockchain ledger.

II. Exemplary Processes for Tracking Assets Using Hybrid Blockchain Ledgers

In some embodiments, client devices 102, 104, and/or 106 may execute one or more stored applications that enable corresponding users to track, in conjunction with peer systems 150 and other components of computing environment 100, a disposition and distribution of one or more assets using conventional, publicly available and transparent blockchain ledgers. In some aspects, the use of public blockchain ledgers to track ownership, disposition, and distribution of actual and/or virtual assets (e.g., unit of virtual currencies, such as Bitcoin™, unit of other financial instruments and securities, physical assets, etc.) may present advantages over existing centralized server systems, such as those provided by financial institutions that leverage private ledgers.

a. Asset Tracking Using Conventional Blockchain Ledgers

Figure 2:
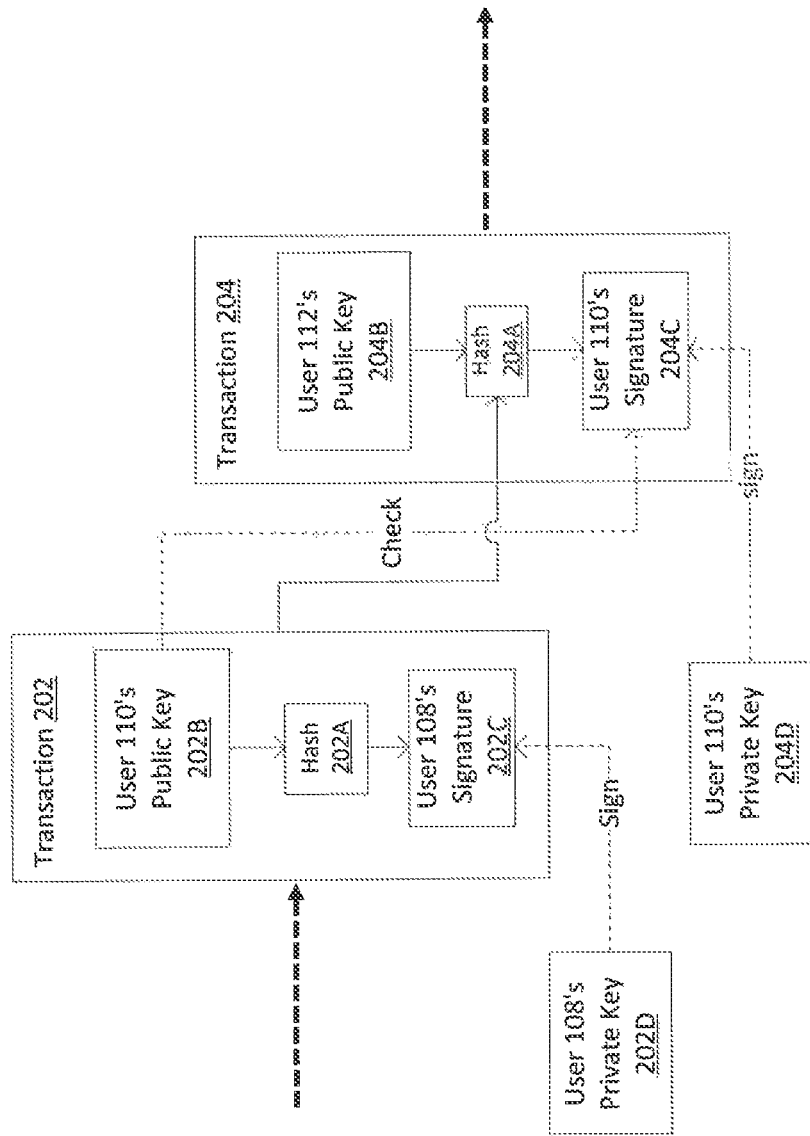
FIG. 2 is a schematic diagram illustrating a conventional blockchain ledger architecture.

FIG. 2 is a schematic diagram of an exemplary structure 200 of a conventional blockchain ledger, which may be generated through the interaction of components of computing environment 100. For example, as described in reference to FIG. 2, a user (e.g., user 110) may be associated with a device (e.g., client device 104) that executes a stored software application (e.g., a wallet application) capable of obtaining a current version of a conventional blockchain ledger from one or more networked computer systems (e.g., one of peer systems 160 configured to "mine" broadcasted transaction data and update ledgers). In some aspects, the current version of a conventional blockchain ledger may represent a "longest" blockchain ledger than includes a maximum number of discrete "blocks," which may identify transactions that transfer, distribute, etc., portions of tracked assets among various owners, including user 110.

For example, client device 104 may obtain the current blockchain ledger, and may process the block chain ledger to determine that a prior owner (e.g., user 108) transferred ownership of a portion of the tracked assets to user 110 in a corresponding transaction (e.g., transaction 202, schematically illustrated in FIG. 2). As described above, one or more of peer systems 160 may have previously data verified, processed, and packed associated with transaction 202 may be into a corresponding block of the conventional blockchain using any of the exemplary techniques described above and/or apparent to one of ordinary skill in the art.

In some aspects, as illustrated in FIG. 2, transaction 202 may include input data that references one or more prior transactions (e.g., transactions that transferred ownership of the tracked asset portion to user 108), and further, output data that includes instructions for transferring the tracked asset portion to one or more additional owners (e.g., user 110). For example, input data consistent with the disclosed embodiments may include, but is not limited to, a cryptographic hash of the one or more prior transactions (e.g., hash 202A) and the set of rules and triggers associated with the assets while the output data consistent with the disclosed embodiments may include, but is not limited to, a quantity or number of units of the tracked asset portion that are subject to transfer in transaction 202 and a public key of the recipient (e.g., public key 202B of user 110).

Further, in some aspects, the transaction data may include a digital signature 202C of user 108 (e.g., the prior owner), which may be applied to hash 202A and public key 202B using a private key 202D of user 108 through any of a number of techniques apparent to one of skill in the art and appropriate to the conventional blockchain ledger architecture. By way of example, the presence of user 108's public key within transaction data included within the conventional blockchain ledger may enable client device 104 and/or peer systems 160 to verify user 108's digital signature, as applied to data associated with transaction 202.

In an embodiment, user 110 may elect to further transfer the tracked asset portion to an additional user (e.g., user 112). For example, as described above, client device 104 may execute one or more software applications (e.g., wallet applications) that generate input and output data specifying a transaction (e.g., transaction 204 of FIG. 2) that transfers ownership of the tracked asset portion from user 110 to user 112, and further, that transmit the generated data to one or more of peer systems 160 for verification, processing (e.g., additional cryptographic hashing) and inclusion into a new block of the clock-chain ledger.

For example, data specifying transaction 204 may include, but is not limited to, a cryptographic hash 204A of prior transaction 202, a quantity or number of units of the tracked asset portion that are subject to transfer in transaction 204, and a public key of the recipient (e.g., public key 204B of user 112). Further, in some aspects, the data specifying transaction 204 may include a digital signature 204C of the user 110, which may be applied to hash 204A and public key 204B using a private key 204D of user 110 using any of the exemplary techniques described above. Further, and by way of example, the presence of user 110's public key 202B within transaction data included within the conventional blockchain ledger may enable various devices and systems (e.g., client devices 106, 106, and/or 108, peer systems 160, etc.) to verify user 110's digital signature 204C, as applied to data specifying transaction 204.

As described above, one or more of peer systems 160 may receive the data specifying transaction 204 from client device 104. In certain instances, peer systems 160 may act as "miners" for the blockchain ledger, and may competitively process the received transaction data (either alone or in conjunction with other data) to generate additional blocks of the ledger, which may be appended to the blockchain ledger and distributed across peer systems 160 (e.g., through a peer-to-peer network) and to other connected devices of environment 100.

In some aspects, conventional blockchain ledger architectures described above may enable the public to review content of the ledgers and verify ownerships. Further, the decentralized nature of conventional blockchain ledgers may also enable multiple distributed networks to verify the contents of a single ledger. The resulting redundancy may render conventional blockchain ledger architecture more robust than centralized server systems, and effectively eliminate the falsification of ledger data by malicious parties.

Despite these advantages, conventional blockchain ledger architectures may exhibit significant flaws when implemented by secured, high-risk systems. By way of example, unencrypted conventional ledger blocks may represent a security concern for transactions of sensitive nature, and further, may represent a privacy concern for members of the general public. For instance, information indicative of an interaction of a prior asset owner and a corresponding device, as present within conventional blockchain ledgers, may represent private information that should not be available to future owners, let alone members of the public.

Further, if an owner were to lose or misplace a corresponding private key, the distributed nature of conventional blockchain ledger architectures, such as those described above, provide little recourse to recover possession of the one or more tracked assets. In certain aspects, the rigidity and inflexibility of these conventional blockchain ledger architectures, and their inability to adapt to changing circumstances (e.g., loss of private keys, theft of tracked assets due to fraudulent or malicious activity), often results in volatility in the usage of the tracked assets and an erosion in a public trust of conventional blockchain ledgers.

Thus, there is a need for improved systems and methods that not only enhance the security of blockchain ledger architectures for use high-risk, sensitive applications, but that also provide a framework that provides owners or holders of assets tracked by blockchain ledger architectures with recourse in an event of fraud or malicious activity, while maintaining the public availability and verification characteristic of blockchain ledgers.

b. Exemplary Hybrid Public-Private Blockchain Ledger Architectures

The disclosed embodiments address these and other problems associated with conventional block-ledger architectures in a technical manner, by providing computer-implemented systems and methods that augment a conventional blockchain ledger with a private-master encryption key architecture that, in conjunction with an owner's pair of public and private blockchain keys, selectively encrypt ledger data to protect both a privacy of owners of tracked assets and a confidentiality of existing instruction sets maintained within the blockchain ledger.

Further, by incorporating an encrypted rules engine and corresponding list of triggering events (e.g., an event triggers list) into each block of the conventional blockchain ledger architecture (and thus generating a hybrid, public-private blockchain architecture), computer-implemented systems and methods consistent with the disclosed embodiments may perform operations that provide owners or holders tracked assets with recovery options in an event of fraud or malicious activity, while maintaining the public availability and verification characteristic of conventional blockchain ledgers.

In certain aspects, discrete data blocks of the conventional blockchain ledgers (e.g., as outlined above in reference to FIG. 2) and of the hybrid blockchain ledgers (e.g., as described in reference to FIG. 3) may include common elements of data that may specify transactions that distribute, transfer, and/or otherwise act upon portions of tracked assets. For example, these common data elements may include, but are not limited to, input data that references one or more prior transactions (e.g., a cryptographic hash of the one or more prior transactions), output data that includes instructions for transferring the tracked asset portion to one or more additional owners (e.g., a quantity or number of units of the tracked asset portion that are subject to the transaction and a public key of the recipient) and further, a digital signature applied to the input and/or output data using a corresponding public key of a current owner of the tracked asset portion. The disclosed embodiments are, however, not limited to exemplary transactions that include a transfer of tracked assets and to the exemplary data elements described above, and in further embodiments, discrete blocks of the hybrid blockchain legers may represent any additional or alternate transaction appropriate to the tracked assets, and further, any additional or alternate data appropriate to the tracked assets and to the transaction.

In contrast to the conventional blockchain ledgers described above, the disclosed embodiments may establish a "rules authority" capable of vetting real-time transactions (e.g., distributions, transfers, and/or other actions) involving portions of assets tracked within the exemplary hybrid blockchain ledger architectures described herein, and further, of establishing and maintaining rules (e.g., through a rules engine and corresponding list of triggering events) that facilitate regulatory-based, policy-based, and customer-specified controls of transactions involving the tracked assets (e.g., units of virtual currency, etc.).

For example, and as described above, business entity 150 may represent the rules authority, and one or more computing components of system 150 may perform operations that establish the rules engine and the list of triggering events, which may be stored within a secure data repository (e.g., data repository 144). In some aspects, the generated and stored rules engine may identify or more rules that regulate a distribution of the tracked assets, an initiation of one or more transactions involving the tracked assets (e.g., a sale, a use of the tracked assets as collateral in a secured transaction etc.), and further, any additional or alternate action involving the tracked assets and/or the hybrid public-private ledger (e.g., processes that generate additional cryptographic key sets for user 110, processes that recover assets racked in the hybrid public-private ledger, etc.). Further, and as described above, the generated and stored list of triggering events may include information that specifies causal relationships between one or more of the established rules and one or more events that trigger an initiation of one or more corresponding regulated distributions, transactions, and/or actions associated with assets tracked within the hybrid public-private ledger (e.g., the triggering events).

In some aspects, system 140 may establish one or more of the rules and/or triggering events to reflect regulations and/or policies promulgated by governmental entity, a financial regulator, and/or the rules authority. For example, system 140 may establish a loss of a private key by user 110 as a "triggering event" that would cause system 140 to perform operations that create a new transaction and generate a new pair of public and private blockchain keys for user 110 in response to a verification of particular authentication credentials. In other aspects, system 140 may establish one or more of the rules and/or triggering events based on information received from user 110 (e.g., as input provided to a web page or other graphical user interface (GUI) presented by client device 104 and provided to system 140). For example, user 110 may specify a particular distribution of tracked assets (e.g., recurring bill payments, distributions to other owners, etc.) in response to an accident involving user 110 and/or user 110's death (e.g., triggering events).

In further contrast to the conventional blockchain ledgers described above, one or more computing components of system 140 (e.g., server 142 upon execution of stored instructions) may generate additional cryptographic keys that facilitate the exemplary regulation of transactions (e.g., distributions, transfers, and/or actions) involving assets tracked within the hybrid public-private ledger. By way of example, system 140 may generate a master cryptographic key with which system 140 may encrypt the generated and stored rules engine. In some aspects, certain aspects, system 140 may store copies of the generated master key in a portion of data repository 144 that is not accessible to user 110 (and any other users), thus maintaining a confidence of the generated master key.

System 140 may also perform operations that encrypt the generated list of triggering events, either alone or in conjunction with metadata identifying the rules authority and/or information facilitating a processing of the transaction blocks throughout the hybrid blockchain ledger. In certain aspects, system 140 may also perform operations that generate and maintain additional private cryptographic keys (e.g., a private "crypto" key) associated with each owner associated with the assets tracked within the hybrid blockchain ledger (e.g., users 108, 110, and/or 112) and further, that would enable the owners to decrypt and access the list of triggering events and additionally or alternatively, the metadata identifying the rules authority. System 140 may store copies of the generated private crypto keys in a portion of data repository 144. Furthermore, system 140 may also perform operations that provide corresponding ones of the private crypto keys to users 108, 110, and/or 112 through secure, non-accessible and/or out-of-band communications.

The disclosed embodiments may also be configured to communicate the encrypted and/or hashed rules engine and list of triggering events to owners of and/or user associated with the tracked assets through "in-band" communication processes, such as through an incorporation of the encrypted rules engine and list of triggering events into the transaction blocks of the hybrid blockchain ledger. For example, system 140 may perform operations that hash the encrypted rules engine and list of triggering events into a genesis block of the hybrid blockchain ledger, the contents of which may be incorporated (e.g., by client devices 102, 104, and/or 106, peer systems 160, etc.) into each of the subsequent transaction blocks generated and appended to the hybrid blockchain ledger. In some aspects, by incorporating the hashed and encrypted rules engine and list of triggering events into blocks of the hybrid blockchain ledger, the disclosed embodiments may ensure that the established rules are followed even in an event of actions by malicious parties to disrupt the tracked assets (e.g., instances of Bitcoin™ peeling, etc.)

Further, in some instances, the additional private crypto keys held by the owners and/or users (e.g., stored in corresponding ones of client devices 102, 104, and/or 106 and accessible to executable application programs) may enable the owners and/or users to access the encrypted list of triggering events maintained within the hybrid blockchain ledger. The owners and/or user may, through corresponding client devices, view the individual events that, when detected by system 140, could cause system 140 to perform operations that recover, authorize, audit, and/or verify the transaction and/or ownership data included within the hybrid blockchain ledger (e.g., associated with corresponding portions of the tracked assets).

In certain aspects, one or more computing components of system 140 may perform operations that modify portions of the stored rules and/or list of triggering events, e.g., in response to changes in regulations and/or policies, in response to additional owner input, etc. In order to access and modify the generated rules engine (and/or the list of triggering events) maintained within the hybrid blockchain ledger, system 140 may leverage the stored master cryptographic key to access and modify the hashed and encrypted rules engine. System 140 may, in certain instances, encrypt and re-hash the modified rules engine and submit the encrypted and hashed modified rules engine to one or more of peer systems 160 for inclusion in a block of the hybrid blockchain ledger. For example, the one or more of peer systems 160 may incorporate the hashed and encrypted modified rules engine into the hybrid blockchain ledger as a special transaction (e.g., a "0" value transaction), such that the hybrid blockchain ledger tracks each change within the modified rules engine.

Figure 3:
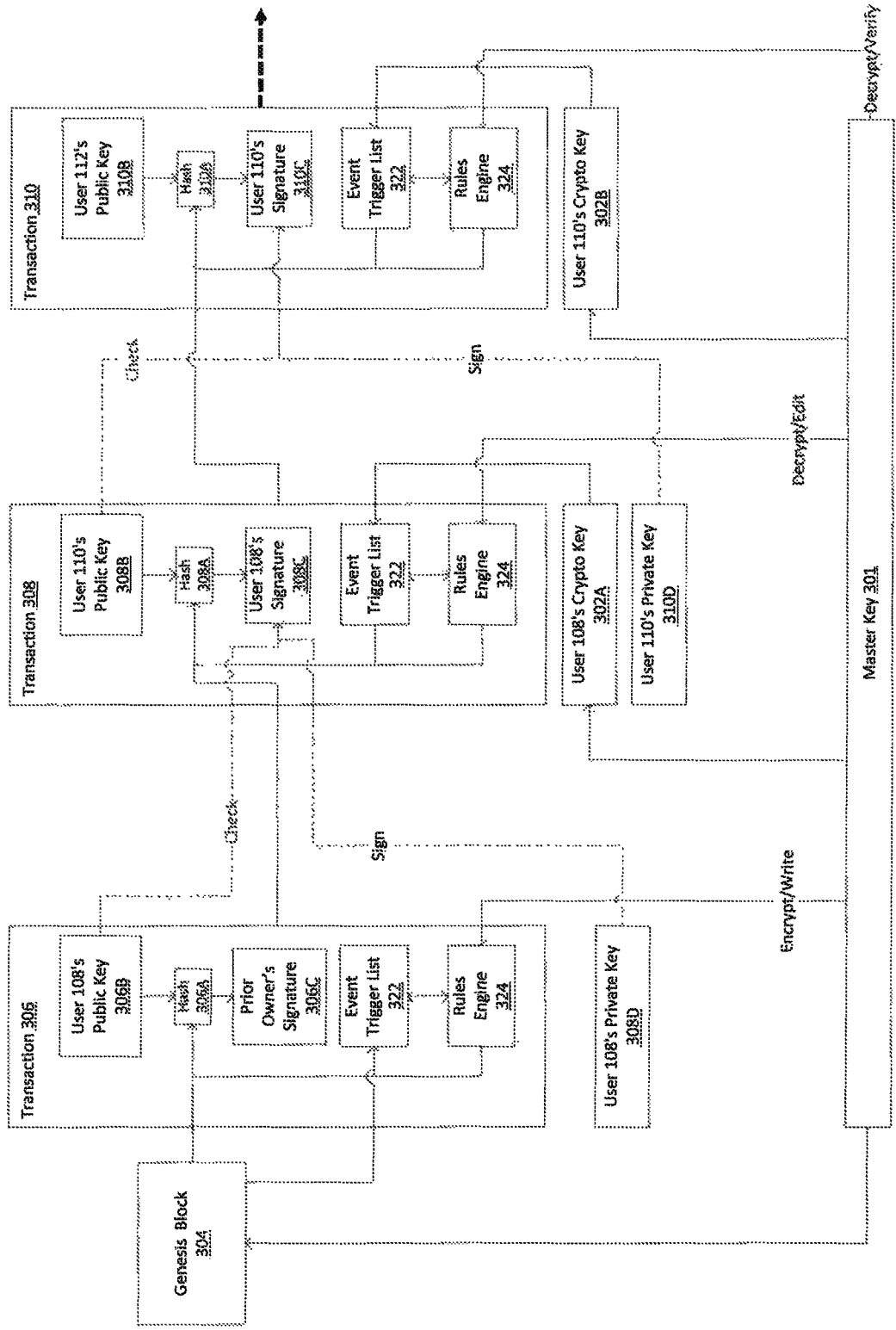
FIG. 3 is a schematic diagram illustrating a hybrid, public-private blockchain ledger architecture, consistent with disclosed embodiments.

FIG. 3 is a schematic diagram of illustrating an exemplary structure 300 of a hybrid, public-private blockchain ledger, which may be generated through the interaction of components of computing environment 100, in accordance with the disclosed embodiments. For example, as described in reference to FIG. 3, users 108, 110, and 112 may be associated with corresponding devices (e.g., client devices 102, 104, and 106), which may be configured to execute one or more stored software applications (e.g., a wallet application) capable of obtaining a current version of a hybrid blockchain ledger from one or more networked computer systems (e.g., one of peer systems 160 configured to "mine" broadcast transactions and update ledgers).

Further, in some aspects, and as described above, a system associated with a rules authority (e.g., system 140 associated with business entity 150) may generate a rules engine that regulate transactions involving the assets tracked by the hybrid blockchain ledger (e.g., distributions, transfers of ownership, other actions, etc.), and further, a list of triggering events that, upon detection by system 140, trigger an initiation of one or more of the distributions, transfers, and/or other actions regulated by the generated rules engine. In additional aspects, and as described above, system 140 may generate a master encryption key (e.g., master key 301 of FIG. 3), which may be system 140 may maintain in a portion data repository 144, and may generate additional private "crypto" keys 302A and 302B, which may be associated with corresponding ones of users 108 and 110 In some aspects, system 140 may maintain private crypto keys 302A, 302B, and 302C in a portion of data repository 144 and provide private crypto keys 302A, 302B, and 302C to users 108, 110, and 112 through secure, out-of-band communications. System 140 may, in additional aspects, encrypt the generated rules engine and the generated list of triggering events, and further, perform operations that hash the encrypted rules engine and list of triggering events into a genesis block of the hybrid blockchain ledger (e.g., genesis block 304).

In an embodiment, one of the users (e.g., user 108) may own and/or control a portion of the tracked assets. For example, a device associated with user 108 (e.g., client device 102) may execute a stored software application (e.g., a wallet application) capable of obtaining a current version of a hybrid blockchain ledger, including genesis block 304, from one or more networked computer systems (e.g., one of peer systems 160 configured to "mine" broadcast transactions and update ledgers). In some aspects, the current version of a hybrid blockchain ledger may represent a "longest" blockchain ledger than includes a maximum number of discrete "blocks," which may identify transactions that transfer, distribute, etc., portions of tracked assets among various owners, including user 108.

For example, client device 102 may obtain the current hybrid blockchain ledger, and may process the hybrid blockchain ledger to determine that a prior owner transferred ownership of a portion of the tracked assets to user 108 in a corresponding transaction (e.g., transaction 306, schematically illustrated in FIG. 3). As described above, one or more of peer systems 160 may have previously data verified, processed, and packed data associated with transaction 306, which may be into a corresponding block of the conventional blockchain using any of the exemplary techniques described above and/or apparent to one of ordinary skill in the art.

In some aspects, as illustrated in FIG. 3, data specifying transaction 306 may include input data that references one or more prior transactions (e.g., transactions that transferred ownership of the tracked asset portion to the prior owner), and further, output data that includes instructions for transferring the tracked asset portion to user 108. For example, and as described above, input data consistent with the disclosed embodiments may include, but is not limited to, a cryptographic hash of the one or more prior transactions (e.g., hash 306A), and output data consistent with the disclosed embodiments may include, but is not limited to, a quantity or number of units of the tracked asset portion that are subject to transfer in transaction 302 and a public key 306B of user 108 (i.e., the recipient of the tracked asset portion transferred in transaction 306). Further, in some aspects, the transaction data may include a digital signature 306C of the prior owner, which may be applied to hash 306A and public key 306B using a private key of the prior owner through any of a number of techniques apparent to one of skill in the art and appropriate to the conventional blockchain ledger architecture.

Further, and in contrast to the conventional blockchain ledger architectures described above, transaction 306 may also include encrypted and/or hashed copies of rules engine 320 and trigger event list 322. In certain aspects, a device of the prior owner (e.g., which may execute one or more software applications) may access genesis block 304 (e.g., from the current version of the hybrid blockchain ledger obtained from one or more of peer systems 160), may parse genesis block 306, and may extract copies of the encrypted and/or hashed rules engine 324 and trigger event list 322. The prior owner's device may transmit to one or more of peer systems 160 along with the hash 306A, public key 306B, and digital signature 306C for verification, processing (e.g., additional cryptographic hashing) and inclusion into a new block of the hybrid blockchain ledger.

In an embodiment, user 108 may elect to further transfer that tracked asset portion to an additional user (e.g., user 110). For example, as described above, the one or more software applications executed by client device 102 may cause client device 102 to perform operations that generate input and output data specifying a new transaction (e.g., transaction 308 of FIG. 3) that transfers ownership of the tracked asset portion from user 108 to user 110, and further, that transmit the generated data to one or more of peer systems 160 for verification, processing (e.g., additional cryptographic hashing) and inclusion into a new block of the hybrid blockchain ledger.

For example, data specifying transaction 308 may include, but is not limited to, a cryptographic hash 308A of prior transaction 306, a quantity or number of units of the tracked asset portion that are subject to transfer in transaction 308, and a public key of the recipient (e.g., public key 308B of user 110). Further, in some aspects, the data specifying transaction 308 may include a digital signature 308C of the user 108, which may be applied to hash 308A and public key 308B using a private key 308D of user 108 using any of the exemplary techniques described above. Further, and by way of example, the presence of user 108's public key within transaction data included within the conventional blockchain ledger may enable various devices and systems (e.g., client devices 102, 104, and/or 106, peer systems 160, etc.) to verify the user 108's digital signature 308D, as applied to data specifying transaction 308.

Additionally, and as described above, client device 102 may also parse data specifying prior transaction 306 (e.g., as obtained from the current version of the hybrid blockchain ledger) and extract encrypted and/or hashed copies of rules engine 324 and trigger event list 322. In certain aspects, client device 102 may append the encrypted and/or hashed copies of rules engine 324 and trigger event list 322 to the data specifying transaction 308 (e.g., cryptographic hash 308A, public key 308B, and digital signature 308C), and transmit the data specifying transaction 308B to one or more of peer systems 160 for verification, processing (e.g., additional cryptographic hashing) and inclusion into a new block of the hybrid blockchain ledger.

Further, and as described above, private crypto key 302A may enable client device 102 (e.g., associated with user 108) to access encrypted event trigger list 322 upon extracted from the hybrid blockchain ledger, as described above. In some embodiments, private crypto key 302A may provide client device 102 with read-only access to the encrypted event trigger list 322. In some aspects, client device 102 may obtain private crypto key 302A from system 140 using secured out-of-band communications, and additionally or alternatively, as input provided by user 108 through a web page or other graphical user interface (GUI) presented by client device 104.

In an embodiment, ownership of the tracked asset portion may be transferred from user 108 to user 110 upon verification and publication of the data specifying transaction 308 within a corresponding block of the hybrid blockchain ledger by peer systems 160. In further embodiments, and as described above, user 110 may elect to further transfer that tracked asset portion to yet another user (e.g., user 112). For example, as described above, the one or more software applications executed by client device 104 may cause client device 104 to perform operations that generate input and output data specifying a new transaction (e.g., transaction 310 of FIG. 3) that transfers ownership of the tracked asset portion from user 110 to user 112, and further, that transmit the generated data to one or more of peer systems 160 for verification, processing (e.g., additional cryptographic hashing) and inclusion into a new block of the hybrid blockchain ledger.

For example, data specifying transaction 310 may include, but is not limited to, a cryptographic hash 310A of prior transaction 308, a quantity or number of units of the tracked asset portion that are subject to transfer in transaction 310, and a public key 310B of user 112. Further, in some aspects, the data specifying transaction 310 may include a digital signature 310C of the user 110, which may be applied to hash 310A and public key 310B using a private key 310D of user 110, as described above. Additionally, and by way of example, the presence of user 110's public key 308B within transaction data included within the hybrid blockchain ledger may enable various devices and systems (e.g., client devices 102, 104, and/or 106, peer systems 160, etc.) to verify the user 110's digital signature 310C, as applied to data specifying transaction 310.

Additionally, and as described above, client device 104 may also parse data specifying prior transaction 308 (e.g., as obtained from the current version of the hybrid blockchain ledger) and extract encrypted and/or hashed copies of rules engine 324 and trigger event list 322. In certain aspects, client device 104 may append the encrypted and/or hashed copies of rules engine 324 and trigger event list 322 to the data specifying transaction 310 (e.g., cryptographic hash 310A, public key 310B, and digital signature 310C), and transmit the data specifying transaction 310 to one or more of peer systems 160 for verification, processing (e.g., additional cryptographic hashing) and inclusion into a new block of the hybrid blockchain ledger. In an embodiment, ownership of the tracked asset portion may be transferred from user 110 to user 112 upon verification and publication of the data specifying transaction 310 within a corresponding block of the hybrid blockchain ledger by peer systems 160.

Further, and as described above, private crypto key 302B may enable client device 104 (e.g., associated with user 110) to decrypt event trigger list 322 upon extraction from the hybrid blockchain ledger, as described above. In some aspects, client device 104 may obtain private crypto key 302B from system 140 using secured out-of-band communications, and additionally or alternatively, as input provided by user 110 through a web page or other graphical user interface (GUI) presented by client device 104. In other aspects, client device 104 may identify and extract private crypto key 302B from a portion of the hybrid blockchain ledger obtained from peer systems 160 (e.g., as a secure in-band communication).

In the embodiments described above, system 140 may establish and maintain rules (e.g., through a rules engine and corresponding list of triggering events) that facilitate regulatory-based, policy-based, and customer-specified controls of transactions involving assets tracked within a hybrid blockchain ledger. For example, client devices 102, 104, and/or 106 may generate transaction data that includes and rules engine and list of triggering events, and one or more of peer systems 160 may embed the generated transaction data into blocks of the hybrid blockchain ledger for reference in subsequent transactions. Further, in certain aspects, system 140 may be configured to detect an occurrence of an event (e.g., based on data received from client devices 102, 104, and/or 106, etc.), may determine whether the list of triggering events includes the detected event, and when triggering event list includes the detected event, perform one or more operations consistent with an established rule that references the detected event, as described below in reference to FIG. 4.

Figure 4:
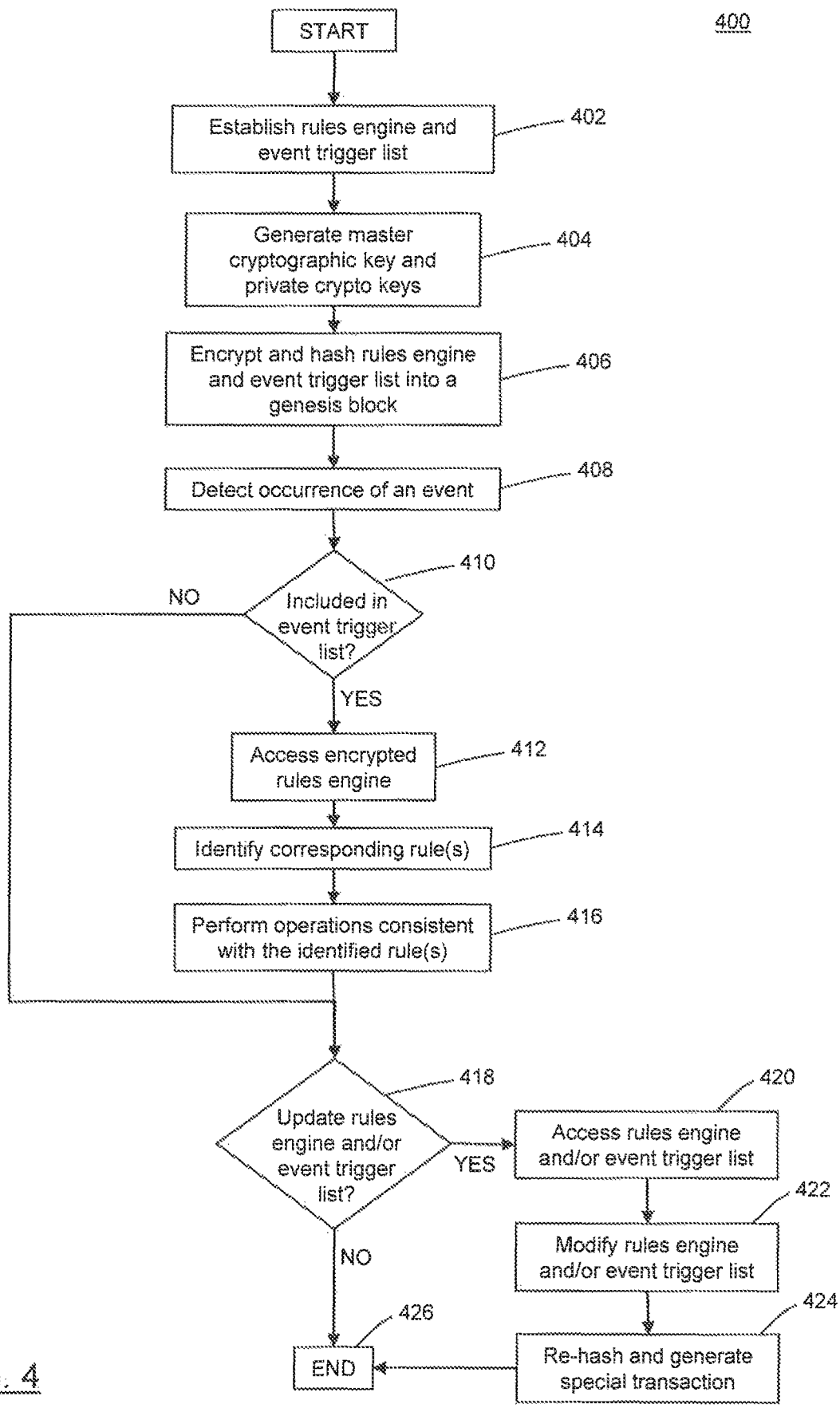
FIG. 4 is a flowchart of an exemplary process for performing operations in response to events tracked within a hybrid blockchain ledger, consistent with the disclosed embodiments.

FIG. 4 is a flowchart of an exemplary process 400 for automatically performing event-based operations on assets tracked within a hybrid blockchain ledger in accordance with disclosed embodiments. In an embodiment, a rules authority may be assigned to establish regulatory-based, policy-based, and customer-specified control over assets tracked within the hybrid blockchain ledger. In some aspects, tracked assets consistent with the disclosed embodiments may include, but are not limited to, units of a virtual currency or a crypto-currency, units of financial instruments held by one or more owners, and physical assets utilized by one or more individuals and/or entities. In some aspects, a computer system associated with the rules authority (e.g., system 140 associated with business entity 150) may execute one more stored application programs to cause system 140 to recover, authorize, audit, and/or verify an ownership of at least a portion of the tracked assets and/or transactions involving he tracked assets based on established and maintained rules.

In one aspect, one or more computing components of system 140 may generate a rules engine and a list of triggering events, which may be stored within a portion of data repository 144 (e.g., in step 402). For example, the generated and stored rules engine may identify or more rules that regulate a distribution of the tracked assets, an initiation of one or more transactions involving the tracked assets (e.g., a sale, a use of the tracked assets as collateral in a secured transaction etc.), and further, any additional or alternate action involving the tracked assets and/or the hybrid public-private ledger (e.g., processes that generate additional cryptographic key sets for user 110, processes that recover assets tracked in the hybrid public-private ledger, etc.). Further, and as described above, the generated and stored list of triggering events may include information that specifies causal relationships between one or more of the established rules and one or more events that trigger an initiation of one or more corresponding regulated distributions, transfers, and/or actions involving assets tracked within the hybrid public-private ledger (e.g., the triggering events).

In certain instances, system 140 may establish, in step 402, one or more of the rules and/or triggering events to reflect regulations and/or policies promulgated by governmental entity, a financial regulator, and/or the rules authority. For example, system 140 may establish a loss of a private key by user 110 as a "triggering event" that would cause system 140 to perform operations that generate a new pair of public and private blockchain keys for user 110 in response to a verification of particular authentication credentials. Further, and by way of example, system 140 may deem a documented theft of a portion of the tracked assets a "triggering event" that would cause system 140 to perform operations recover the stolen portion of the tracked assets and generate a new pair of public and private blockchain keys for user 110.

In other instances, system 140 may establish, in step 402, one or more of the rules and/or triggering events based on information received from user 110 (e.g., as input provided to a web page or other graphical user interface (GUI) presented by client device 104 and provided to system 140). For example, user 110 may specify a particular distribution of tracked assets (e.g., recurring bill payments, etc.) in response to an accident involving user 110 and/or user 110's death (e.g., triggering events). The disclosed embodiments are, however, not limited to these exemplary triggering events and corresponding rules, and in further embodiments, system 140 may establish any additional or alternate rules and/or triggering events appropriate to the tracked assets, to business entity 150, and further, to users 108, 110, and 112.

Further, one or more computing components of system 140 may generate additional cryptographic keys that facilitate the exemplary regulation of transactions (e.g., distributions, transfers, and/or actions) involving assets tracked within the hybrid public-private ledger (e.g., in step 404). By way of example, in step 404, system 140 may generate a master cryptographic key with which system 140 may encrypt the generated and stored rules engine, as described above. In some aspects, certain aspects, system 140 may store copies of the generated master key in a portion of data repository 144 that is not accessible to user 110 (and any other users), thus maintaining a confidence of the generated master key.

Further, in step 404, system 140 may also perform operations that generate and maintain additional private cryptographic keys (e.g., private "crypto" keys) associated with each owner of the assets tracked within the hybrid blockchain ledger. As described above, the generated private crypto keys may enable a device of each of owner to decrypt and access the list of triggering events and additionally or alternatively, metadata identifying the rules authority. System 140 may store copies of the generated private crypto keys in a portion of data repository 144. Furthermore, system 140 may also perform operations that provide corresponding ones of the private crypto keys to users 108, 110, and/or 112 through secure, non-accessible and/or out-of-band communications.

In step 406, system 140 may perform operations that encrypt the generated and stored rules engine (e.g., using the master encryption key) and further, that encrypt the generated and stored list of triggering events (e.g., using any of the exemplary techniques described above that facilitate decryption using the private crypto keys). For example, system 140 may perform operations in step 406 that hash the encrypted rules engine and list of triggering events into a genesis block of the hybrid blockchain ledger, the contents of which may be incorporated (e.g., by client devices 102, 104, and/or 106, peer systems 160, etc.) into each of the subsequent transaction blocks generated and appended to the hybrid blockchain ledger. In some aspects, by incorporating the hashed and encrypted rules engine and list of triggering events into the blocks of the hybrid blockchain ledger, the disclosed embodiments may ensure that the established rules are followed even in an event of actions by malicious parties that disrupt the tracked assets (e.g., instances of Bitcoin™ peeling, etc.).

Further, in some embodiments, one or more computing components of system 140 may detect an occurrence of an event involving a portion of the tracked assets, an owner of a portion of the tracked assets, and/or a transaction involving a portion of the detected assets (e.g., in step 408). For example, system 140 may receive data from client device 104 that indicates user 110 lost a corresponding private blockchain key associated with a portion of the tracked assets. In other instances, system 140 may detect an event in step 140 based on data received across network 120 from one or more systems associated with local, state, and/or federal governmental entities (e.g., data from a law enforcement system notifying business entity 150 of a theft of a portion of the tracked assets, data from a local government confirming a death of an owner of a portion of the tracked assets, etc.). Further, in additional instances, system 140 may detect an occurrence of an event based on one or more sensors and devices communicatively connected to network 120 and capable of transmitting data to system 140. The disclosed embodiments are, however, not limited to these exemplary events, and in further embodiments, system 140 may be configured to detect any additional or alternate event appropriate to the tracked assets and to the components of computing environment 100.

System 140 may also be configured to access the stored list of triggering events (e.g., within database 144), and may determine whether the list of triggering events includes the detected event (e.g., in step 410). If system 140 were to identify the detected event within the list of triggering events (e.g., step 410; YES), system 140 may establish the detected event as a triggering event, and may access the encrypted rules engine using the master encryption key (e.g., in step 412). System 140 may further identify, within the accessed rules engine, one or more of the established rules that are causally related to the detected triggering event (e.g., in step 414). Further, in some aspects, system 140 may be configured to perform one or more operations, either individually or in sequence, that are consistent with the identified rules (e.g., in step 416). For example, the accessed rules engine may include information identifying the one or more operations associated with the identified rules. In other instances, at least one of the performed operations may represent a default operation associated with the identified rules (e.g., a specific type of authentication required before performing the one or more operations on behalf of user 110).

In one embodiment, one or more computing components of system 140 may also determine whether to update portions of the generated rules engine and/or list of triggering events (e.g., in step 418). For example, system 140 may identify an update or modification to one or more regulations and/or policies promulgated by governmental entity, a financial regulator, and/or the rules authority. In other instances, system 140 may obtain, from client device 104, information updating a rule and/or triggering event previously established by system 140 based on input received from user 110 (e.g., through a web page and/or GUI presented by client device 104).

If system 140 determines to update portions of the generated rules engine and/or list of triggering events (e.g., step 418; YES), system 140 may access appropriate portions of the rules engine and/or list or triggering events in step 420 (e.g., using the master encryption key and/or any of the exemplary techniques described above), and may modify the appropriate portions of the rules engine and/or list of triggering events to reflect the updated regulations, policies, user-specified rules, and/or user-specified events (e.g., in step 422). In some instances, system 140 may modify the accessed rules engine by adding a new rule, deleting an existing rule, modifying one or more parameters of an existing rule, and/or modifying one or more operations associated with an existing rule. In other instances, system 140 may modify the accessed list of event triggers to add a new triggering event, delete an existing triggering event, and/or add or modify parameters associated with an existing triggering event.

In some aspects, system 140 may encrypt and re-hash the modified rules engine and/or list of triggering events, and may submit the encrypted and hashed modified rules engine and/or list of triggering events to one or more of peer systems 160 for inclusion in a block of the hybrid blockchain ledger (e.g., in step 424). For example, one or more of peer systems 160 may incorporate the hashed and encrypted modified rules engine and/or list of triggering events into the hybrid blockchain ledger as a special transaction (e.g., a "0" value transaction), such that the hybrid blockchain ledger tracks each change within the modified rules engine and/or list of triggering events. Exemplary process 400 is then complete in step 426.

Referring back to step 418, if system 140 were to determine that no modification to the rules engine and/or the list of triggering events is warranted (e.g., step 418; NO), exemplary process 400 may pass forward to step 426, and exemplary process 400 is complete. Further, and in reference to step 410, if system 140 were to determine that the list of triggering events fails to include the detected event (e.g., step 410; NO), exemplary process 400 may pass forward to step 418, and system 140 may determine whether to update portions of the rules engine and/or list of triggering events using any of the exemplary processes described above.

In the embodiments described above, and through the generation of the master cryptographic key and management of the generated rules engine and corresponding list of triggering events, system 140 may perform operations that recover, authorize, audit, and/or verify an ownership of at least a portion of the tracked assets and/or transactions involving the tracked assets. In certain aspects, the operations performed by system 140, which utilize hybrid blockchain ledgers consistent with the disclosed embodiments, would not be possible using the conventional blockchain ledgers described above.

For example, user 110 may be an avid user of a virtual or crypto-currency (e.g., Bitcoin™), user 110 may store a private key (e.g., private key 310D) on a laptop computer (e.g., client device 104) to generate and confirm Bitcoin™ transactions. In one instance, user 110 may unfortunately drop the laptop into a swimming pool while confirming a Bitcoin™ with private key 310D, and upon retrieved from the swimming pool, user 110 may establish that the laptop no longer functions and that data on the laptop is not recoverable.

Through a device in communication with network 120 (e.g., user 110's smartphone), user 110 may access a conventional blockchain ledger, such as those conventional architectures outlined above, and determine that the Bitcoin™ transfer was incomplete when user 110 dropped the laptop into the swimming pool. Further, user 110 may determine that the Bitcoin™ transaction represents an orphaned block within the conventional blockchain ledger, and the Bitcoins™ associated with the orphaned block are unrecoverable and permanently lost.

In other aspects, user 110 may access a hybrid blockchain ledger (e.g., as described above in reference to FIG. 3), and may determine that the Bitcoin™ transfer was incomplete when user 110 dropped the laptop into the swimming pool. In an embodiment, however, user 110 may provide input to the smartphone identifying the unrecoverable private key, which the smartphone may transmit to system 140 across network 120. In some aspects, system 140 may receive the transmitted message (e.g., In step 408), may determine that user 110's loss of private key 310D represents a triggering event (e.g., step 410; YES), and may perform operations that authenticate user 110's identity and that regenerate a pair of private and public blockchain keys for user 110, which system 140 may transmit to user 110 through any of the secure non-accessible processes outlined above (e.g., in steps 412, 414, and 416). Upon receipt of the newly generated private key, user 110 may access the hybrid blockchain ledger (e.g., through the smartphone) and confirm the Bitcoin™ transfer to recover the crypto-currency.

Further, and by way of example, user 110 may access a wallet application executed by client device 104, and further, may determine that the mobile wallet is missing a number Bitcoins™. User 110 may suspect that the loss of the Bitcoins™ represents a theft by a malicious entity, and through a complex search of a corresponding blockchain ledger (e.g., conventional blockchain ledgers described above, and/or hybrid blockchain ledgers consistent with the disclosed embodiments), user 110 may trace the theft of the Bitcoins™ to a single transaction within a corresponding block. User 110 may contact the police e-crime unit and report the theft, and the police may confirm the accuracy of user 110's allegations regarding the theft.

User 110 may, in some instances, be capable of processing the conventional blockchain ledgers described above to determine an address of the malicious entity responsible for the theft. The decentralized and anonymous nature of conventional blockchain ledgers may, however, prevent user 110 from identifying the malicious entity, and the stolen Bitcoins™ may remain permanently unrecoverable.

The disclosed embodiments may, however, address the deficiencies of conventional blockchain ledgers and provide user 110 with recourse to recover the stolen Bitcoins™. For example, the police e-crime unit may notify the rules authority of the theft of user 110's Bitcoins™ and destination address associated with the malicious entity (e.g., through a message transmitted to system 140 and received, e.g., in step 408). System 140 may determine that the theft of the Bitcoins™ represents a triggering event included within the generated list (e.g., step 410; YES), and may perform operations that automatically create a request for a new transaction that returns the stolen Bitcoins™ to user 110 using any of the exemplary techniques described above (e.g., in steps 412, 414, and 416). System 140 may also perform operations that regenerate a pair of private and public blockchain keys for user 110, which system 140 may transmit to user 110 through any of the secure non-accessible processes outlined above (e.g., in steps 412, 414, and 416).

The hybrid blockchain ledger architectures described above may add a level of sophistication to conventional mechanisms for trustless communication by allowing transactions involving tracked assets to occur according to common transaction rules. Further, the hybrid blockchain ledger architectures consistent with the disclosed embodiments may allow owners of the tracked assets to project authority over the tracked assets by establishing customized rules for transaction authorization. Furthermore, and in contrast to the conventional techniques described above, the hybrid blockchain ledger architecture may enable a rules authority (e.g., business entity 150 associated with system 140) to recover, authorize, audit, and/or verify an ownership of at least a portion of the tracked assets and/or transactions involving the tracked assets based on established and maintained rules.

In the embodiments described above, and through the generation of a master cryptographic key and management of a generated rules engine and corresponding list of triggering events, system 140, acting as a rules authority, may perform operations that recover, authorize, audit, and/or verify an ownership of at least a portion of the tracked assets and/or transactions involving the tracked assets. In some aspects, and as outlined above, tracked assets consistent with the disclosed embodiments may include, but are not limited to, units of a virtual currency or a crypto-currency, units of financial instruments held by one or more owners, and physical assets utilized by one or more individuals and/or entities.

III. Exemplary Processes for Tracking, Monitoring and Valuing Enterprise-Specific Events Using Hybrid Blockchain Ledgers In various embodiments described above, computer systems of rules authority (e.g., a financial institution, etc.) augment conventional, decentralized blockchain ledger architectures by selectively encrypt ledger data to protect both a privacy of owners of tracked assets and a confidentiality of existing instruction sets maintained within the blockchain ledger. Further, by incorporating an encrypted rules engine and corresponding list of triggering events (e.g., an event triggers list) into each block of the conventional blockchain ledger architectures (and thus generating a hybrid, public-private blockchain ledger architecture), computer-implemented systems and methods consistent with the disclosed embodiments may perform operations that provide owners or holders tracked assets with recovery options in an event of fraud or malicious activity, while maintaining the public availability and verification characteristic of conventional blockchain ledgers.

Further, and consistent with the disclosed embodiments, client devices 102, 104, and/or 106 may execute stored software applications (e.g., mobile applications provided by the rules authority), which may cause client devices 102, 104, and/or 106 to transmit data identifying transactions involving held assets to one or more computer systems across network 120 (e.g., one or more of peer systems 160). As described above, peer systems 160 may act as "miners" for hybrid blockchain ledgers consistent with the disclosed embodiments, and may competitively process the received transaction data (either alone or in conjunction with other data) to generate additional ledger blocks, which may be appended to the hybrid blockchain ledgers and distributed across peer systems 160 (e.g., through a peer-to-peer network) and to other connected devices of environment 100 (e.g., across network 120).

The disclosed embodiments are, however, not limited to publicly accessible networks that validate and aggregate blocks of a hybrid blockchain ledger to record and track transfers of held assets (e.g., virtual currencies, etc.) between devices of individual users. In other aspects, hybrid blockchain ledger architectures consistent with the disclosed embodiments may be established and maintained not by a publicly accessible network of mining systems, but by a computer system associated with an enterprise or other business entity (e.g., system 140 acting as a rules authority within the enterprise), which may be in communication with various devices operating across the enterprise (e.g., one or more of client devices 102, 104, and 106).

In certain aspects, system 140's maintenance of enterprise-specific, hybrid blockchain ledger architectures may provide a rules mechanism to detect and track occurrences of specific events and/or transactions across the enterprise and further, to broadcast data indicative of these tracked occurrences within a uniform data structure accessible by devices operating across the enterprise. For example, modern enterprises, such as financial institutions, law firms, large-scale equipment manufacturers, and oil and energy institutions, are often segmented into multiple, geographically-dispersed business units or lines-of-business having devices that execute various and often mutually-incompatible software applications (with corresponding mutually-incompatible data inputs and outputs). In some aspects, system 140 may provide the enterprise devices within common software applications (e.g., mobile applications, plug-ins called by other executable applications, such as web browsers, etc.) capable of capturing data indicative of specific events and, though a corresponding call to an appropriate application programming interface (API), transmit predetermined potions of the captured data to system 140 for inclusion within one or more blocks of a hybrid blockchain ledger, as described below. Further, the software applications executed by the enterprise device may, in additional aspects, access portions of the hybrid blockchain ledger established and maintained by system 140 and selectively present the accessed portions of the hybrid blockchain ledger through a corresponding graphical user interface (GUI), e.g., as entries in a tabular data structure.

System 140 may thus function as a rules clearinghouse to receive predetermined data indicative of occurrences of specific events from various devices disposed throughout the enterprise, and to establish and maintain hybrid blockchain ledger data that tracks the event occurrences in a format accessible to the various enterprise devices. Further, in additional aspects, the event triggers and rules engines incorporated into the exemplary hybrid blockchain ledgers described above (e.g., event trigger list 322 and rules engine 324 of FIG. 3) may enable system 140 to perform operations based on the captured event occurrences (e.g., based on single events, cumulative events, etc.) in a manner transparent to devices, individuals, and entities operating within the enterprise.

For example, the various lines-of-business of a large enterprise, such as a financial institution, may offer distinct product portfolios (e.g., financial products, management services etc.) to customers. Although operating within a common enterprise, the fragmented nature of these distinct lines-of-business may result in a referral of a customer across the lines-of-business in order to access desired products and/or services. The lack of line-of-business integration may lead to an environment characterized by incoherent customer management, which may prevent conventional block-ledger architectures from tracking and quantifying occurrences of enterprise-specific events, such as cross-line-of-business referrals and cross-line-of-business interactions.

In one embodiment, system 140 may receive, from devices operating across the enterprise, data indicative of customer referrals across the enterprise's lines-of-business and data indicative of customer activities that result from the customer referrals (e.g., acquisitions of available products or services, etc.). In certain aspects, system 140 may aggregate and store portions of the received data, portions of which system 140 may process to generate corresponding blocks of a hybrid blockchain ledger architecture using any of the exemplary techniques described above. Further, and based on the event trigger lists and rules engines described above, system 140 may detect a particular customer referral or customer activity (or a cumulative effect of multiple customer referrals or activities) that would trigger a reward to an employee and/or line-of-business, and perform operations that provide the reward to the employee and/or line-of-business in accordance with the rules engine.

By way of example, a customer of an enterprise, such as a financial institution, may schedule an appointment with a loan officer at a particular physical branch of the financial institution to acquire a mortgage on a new home. In some instances, to schedule the appointment, the customer (e.g., user 108) may execute a web browser or a mobile application provided by the financial institution on a corresponding device (e.g., client device 102), and may provide input scheduling the appointment to the web page or a graphical user interface (GUI) presented to the customer by client device 102. In other instances, the customer may, using client device 102, view a digital advertisement for mortgage products offered by the financial institution (e.g., a Google Ad™, etc.) and upon selection of the digital advertisement, client device 102 may present a web page or other graphical user interface (GUI) that enables the scheduling of the appointment.

For example, to schedule the appointment, the customer may provide to client device 104 information that includes, but is not limited to, the customer's name, an appointment date, time, and location, and a potential value of the mortgage (i.e., a "lead value" of $500,000), which client device 102 may transmit to a component of system 140 along with information identifying client device 102 (e.g., a MAC address or an IP address) and a time stamp of the request. In some aspect, system 140 may execute software applications that schedule the appointment with the loan officer at the requested date and time, and as described below, may perform operations that include portions of the received data as a "transaction" in a block of one or more hybrid blockchain ledger architectures.

In some aspects, the customer may attend the scheduled appointment with the loan officer at the physical branch of the financial institution, and after discussions, may acquire a mortgage having an actual value of $800,000 (e.g., as opposed to the $500,000 proposed upon scheduling the appointment). In an embodiment, a device held by the loan officer (e.g., client device 104) may execute software applications (e.g., stand-alone applications or plug-ins called by other executable applications) that capture data indicative of an outcome of the appointment (e.g., the acquisition of the $800,000 mortgage), which client device 104 may transmit to system 140 using any of the communications protocols outlined above. As described herein, system 140 may perform operations that incorporate portions of the received data into a corresponding "transaction" block of one or more hybrid blockchain ledger architectures. Further, in some aspects, system 140 may detect the acquisition of the mortgage as an event triggering a generation of an additional block within at least one of the hybrid blockchain ledger architectures (e.g., based on events trigger list 322), which may tracks lead and actual values associated with the appointment (i.e., an actual value of $800,000, and the lead value of $500,000) and information associated with an employee or line-of-business of the financial institution responsible for the lead and the mortgage (i.e., the loan officer).

Further, prior to departing the branch, the customer may inquire about the financial institution's wealth management and commercial banking services. For example, the customer may consider transferring management of a portion of an investment portfolio (e.g., valued at $400,000) to the wealth management unit of the financial institution, and may express interest in opening a revolving credit line of $500,000 with the financial institution's commercial banking unit. In certain aspects, a customer service representative of the financial institution may refer the customer to appropriate representatives of the wealth management and commercial banking units, and a device of the customer service representative (e.g., client device 106) may execute software applications (e.g., a mobile application or plug-in provided by system 140) that establish the appropriate referrals based on data input by the customer service representative.

For example, the referral data may include, but is not limited to, the customer's name, a description of the product or service (e.g., wealth management services or revolving commercial credit lines), an identity of the target line-of-business (e.g., the wealth management unit or the commercial banking unit), and a lead value of the referral (e.g., a transfer of a portfolio valued at $400,000 or a $500,000 line of credit). In some aspects, client device 106 may transmit the referral data to system 140 using any of the communications protocols outlined above, along with additional data that includes, but is not limited to, information identifying a source of the referrals (i.e., the customer service representative at the branch), information identifying client device 106 (e.g., a MAC address or IP address), and time stamps for the referrals. In further aspects, system 140 may execute software applications that include portions of the received referral data as corresponding "transactions" in blocks of one or more hybrid blockchain ledger architectures, as outlined below.

In further aspects, devices associated with the representatives of the wealth management and commercial banking units (i.e., the target lines-of-business of the customer service representative's referrals) may capture information indicative of the customer's activities in response to the referrals. For instance, and in response to the customer service representative's referral, the customer may schedule an appointment with the representative of the wealth management unit (e.g., using any of the processes described above), and after discussing the wealth management services offered by the financial institution, the customer may elect to transfer management of a larger portion of the investment portfolio to the financial institution (e.g., a portion of the portfolio valued at $1,000,000, as opposed to the lead value of $400,000). Further, and responsive to the customer service representative's referral, the customer may elect to obtain a $500,000 line-of-credit with the financial institution's commercial banking unit, and a device held by a representative of the commercial banking unit may capture data indicative of an outcome of the referral (e.g., the opening of the $500,000 portfolio), which the device may transmit to system 140 using any of the communications protocols outlined above.

In certain aspects, system 140 may perform operations that include portions of the received data as a "transactions" in blocks of one or more hybrid blockchain ledger architectures. Further, in some aspects, system 140 may detect the transfer of the investment portfolio or the opening of the line-of-credit as an event triggering a generation of additional blocks within at least one of the hybrid blockchain ledger architectures. The additional blocks may track, among other things, an actual value associated with the corresponding ones of the referrals (e.g., the $1,000,000 investment portfolio and/or the $500,000 line-of-credit), and information associated with an employee or line-of-business of the financial institution responsible for the lead (e.g., the customer services representative) and the activity (e.g., the representatives of the wealth management and commercial banking units).

As described above, the disclosed embodiments may be configured to provide, to system 140, data identifying not only the interactions and activities between a customer and various lines-of-business of an enterprise (e.g., a financial institution), but also data indicative of the interactions between the lines-of-business (e.g., cross-line-of-business referrals) that generate the customer activities. In certain aspects, system 140 may receive the data indicative of the customer activities and cross-line-of-business referrals from devices held by representatives of the lines-of-business that generate the referrals, and additionally or alternatively, that facilitate the activities or purchases that result from the referrals (e.g., the acquisition of the mortgage, the transfer of the investment portfolio, the opening of the line-of-credit, etc.). System 140 may, for example, characterize each referral, customer activity, or customer interaction as a "transaction," and may further associate each transaction with a corresponding customer (e.g., through a customer number, user name, or alpha-numeric identifier). Further, and prior to incorporation into blocks of one or more hybrid blockchain ledgers, system 140 may store data identifying the transactions associated with each customer as a data records in a customer-specific accounting ledger (e.g., within data repository 144).

FIG. 5 is a schematic diagram of an exemplary accounting ledger 500 identifying referrals and line-of-business interactions involving a particular customer of a financial institution, in accordance with the disclosed embodiments. For instance, and as described above, the customer (e.g., user 108) may interact with various lines-of-business of the financial institution, and devices of corresponding representatives of these lines-of-business may transmit data indicative of the interactions, referrals that result in the interactions, and further, activities that result from the interactions (e.g., the acquisition of a mortgage, the opening of a credit line, the transfer of an investment portfolio, etc.). In some aspects, and as a step preparatory to incorporating the received data into blocks of one or more hybrid blockchain ledgers, system 140 may store the received data associated with each of the interactions, referrals, and/or activities (i.e., the "transactions") as data records in a customer-specific accounting ledger within a portion of a local data repository (e.g., data repository 144).

For example, in FIG. 5, accounting ledger 500 may store data records indicative of transactions involving user 108, and may include a data record 510 corresponding to user 108's request to schedule an appointment with the loan officer at the physical branch of the financial institution (i.e., "Transaction No. 1" in FIG. 5). Further, in one aspect, data record 502 also identifies a time stamp of user 108's request (e.g., 7:01 p.m. on Nov. 10, 2014), a source of the request (e.g., web-based interface "EasyWeb™"), a target of the request (e.g., the loan officer), and a lead value associated with the request (e.g., $500,000). Accounting ledger 500 also includes data record 512, which includes data indicative of user 108's acquisition of an $800,000 mortgage from the loan officer during the appointment at 3:00 p.m. on Nov. 11, 2014 (i.e., "Transaction No. 2" in FIG. 5). Data record 504 also identifies a source of the acquisition (e.g., the loan officer), a target of the acquisition (e.g., the financial institution's residential lending unit), an actual value of mortgage (e.g., $800,000) and the lead value of the referral that led to the mortgage (e.g., $400,000).

Further, as illustrated in FIG. 5, accounting ledger 500 also includes data record 514, which includes data indicative of the customer service representative's referral of user 108 to the wealth management (i.e., "Transaction No. 3" in FIG. 5), and data record 508, which tracks user 108's transfer of the $1,000,000 investment portfolio to the wealth management unit in response to the referral (i.e., "Transaction No. 4" in FIG. 5). For example, data record 514 indicates that the customer service representative (CSR) of the physical branch referred user 108 to a financial services representative (FSR) of the wealth management unit on Nov. 11, 2014, at 4:01 p.m., and further, that a lead value of the referral corresponds to $400,000. Further, and by way of example, data record 516 may indicate that, in response to a meeting with the wealth FSR, user 108 agreed to transfer management of an investment portfolio valued at $1,000,000 (e.g., the actual value of the activity) on Feb. 5, 2015, at 11:30 a.m., that the wealth FSR corresponds to a source of the transfer, and that the wealth management unit of the financial institution corresponds to a target of the transfer.

Accounting ledger 500 further includes data record 518, which includes data indicative of the customer service representative's referral of user 108 to the commercial banking unit (i.e., "Transaction No. 5" in FIG. 5), and data record 520, which tracks user 108's opening of a $500,000 line-of-credit in response to the referral (i.e., "Transaction No. 6" in FIG. 5). For example, data record 518 indicates that the customer service representative (CSR) of the physical branch referred user 108 to FSR of the commercial banking unit on Nov. 11, 2014, at 4:01 p.m., and as discussed above, that a lead value of the referral corresponds to $500,000. Further, and by way of example, data record 520 may indicate that, in response to a meeting with the commercial banking FSR, user 108 agreed to open a $500,000 line-of-credit on Dec. 5, 2014 at 1:45 p.m., that the commercial banking FSR corresponds to a source of the activity, and the commercial banking unit of the financial institution corresponds to a target of the transfer, and further, that the actual and lead values each correspond to $500,000.

In some aspects, system 140 may generate accounting ledger similar in composition and structure to accounting ledger 500 for each customer of the financial institution that interacts within one or more of the multiple, segmented lines-of-business. Further, although described in terms of an accounting ledger that includes data records identifying time stamps, resulting activities, sources, targets, and actual and lead values of a customer's interactions with the lines-of-business and referrals between the lines-of-business, the disclosed embodiments are not limited to these exemplary parameters and in further aspects, accounting ledgers consistent with the disclosed embodiments may include any additional or alternate parameters that characterize the customer's interaction with the lines-of-business. By way of example, these additional or alternate parameters may include, but are not limited to, data identifying a system or device that generates the referral or interaction, an employee at the source line-of-business, and an employee associated with the target line-of-business.

As described above, system 140 may incorporate (i) data identifying the interactions and activities between a customer and the various lines-of-business of the financial institution and (ii) data identifying the referrals across the various lines-of-business of the financial institution as discrete "transactions" within blocks on one or more hybrid blockchain ledger architectures. For example, system 140 may generate a new block for each of the transactions for each customer, and may concatenate each of the generated new blocks to an end of an appropriate one (or more) of the hybrid blockchain ledger files prior to hashing and encryption using any of the exemplary techniques described above.

In one embodiment, system 140 may establish and maintain one or more hybrid blockchain ledger for each customer of the financial institution (e.g., as stored in portions of data repository 144). For example, and as described above, a particular customer (e.g., user 108) may register for one or more digital banking services provided by the financial institution and additional or alternatively, may present one or more forms of identification at a physical branch of the financial to open or obtain access to one or more financial services accounts or products provided by financial institution (e.g., know-your-client (KYC) credentials specific to the financial institution, the financial services accounts, and/or the financial products). Upon registration for digital banking services and/or presentation of the KYC credentials, system 140 may establish, for the user 108, a public-private key pair and a crypto key using any of the exemplary techniques described above, and may transmit the generated keys to user 108 through secure, non-accessible and/or out-of-band communications. In certain aspects, system 140 may encrypt a generated event trigger list (e.g., event trigger list 322) with the customer's crypto key, may encrypt a generated rules engine (e.g., rules engine 324) with a master key associated with system 140 (e.g., acting as a rules authority of the enterprise), and further, may perform operations that hash the encrypted rules engine and list of triggering events into a genesis block of a hybrid blockchain ledger for the customer (e.g., genesis block 304).

In some embodiments, the hybrid blockchain ledger generated and maintained by system 140 on behalf of user 110 may track each transaction involving user 110 (e.g., interactions and activities involving the various lines-of-business, referrals between lines-of-business that involve user 110, etc.) from initial registration and/or account creation using KYC credentials. For example, and as described above, a customer service representative at a physical branch of the financial institution may provide input to a corresponding device that identifies a referral of user 110 to the financial institution's wealth management unit (e.g., "Transaction 3" of FIG. 5). The customer service representative's device may execute software applications that, through standard API call, transmit information characterizing the referral to system 140. In some aspects, system 140 may generate a data record for the transaction in a corresponding accounting ledger, and may incorporate the received transaction data into a new block of a corresponding customer-specific hybrid blockchain ledger using any of the exemplary techniques described above.

For example, and as described above, the data specifying a particular transaction, which system 140 may incorporate into the new block of the customer-specific hybrid blockchain ledger, may include, but is not limited to, an address of an immediately previous block of the customer-specific hybrid blockchain ledger, a block size, a block header, a value of a transaction counter, a corresponding time stamp, a source line-of-business, a target line-of-business, data identifying a system or device that captured and transmitted the transaction data (e.g., a MAC address, IP Address, etc.), and employee of the source line-of-business that initiated the particular transaction, an activity associated the transaction (e.g., an acquisition of a mortgage, an opening of a credit line, etc.), and an accounting ledger corresponding to the transaction (e.g., a corresponding one of the data records in FIG. 5).

In certain aspects, system 140 may generate a distinct block of the customer-specific hybrid blockchain ledger for each transaction involving user 110, and additionally or alternatively, may aggregate the transactions involving user 110 during a particular temporal period, and generate a block of the customer-specific hybrid blockchain ledger that incorporates data specifying the aggregated transactions using any of the exemplary techniques described above. For example, the particular temporal period may include, but is not limited to, one hour, a twenty-four hour period, a week, and any additional or alternate temporal period appropriate to system 140 and the transactions involving user 110.

In additional aspects, system 140 may be configured to track a value generated by a particular customer's interaction with one or more lines-of-business by establishing and maintaining one or more side chains for the customer-specific hybrid blockchain ledger. By way of example, system 140 may identify a pair of source and target lines-of-business associated with a particular transaction, and when a successive transaction corresponds to a different pair of source and target lines-of-business, system 140 may perform operations that automatically generate a side chain that tracks the particular customer's interaction with the different pair of source and target lines-of-business, append a value generated by the tracked interaction to a new block (i.e., a value block), and concatenate the value block to an end of the side chain.

For example, in reference to FIG. 5, system 140 may determine that the pair of source and target lines-of-business associated with Transaction Nos. 3 and 4 (e.g., "Branch" and "Wealth") differ that that associated with Transaction No. 2. Thus, in certain aspects, system 140 may establish a side chain for the particular customer (e.g., user 110) that tracks the particular customer's interaction with the "Branch" and "Wealth" lines-of-business, and appends the $1,000,000 in value generated by the transfer of the particular customer's investment portfolio to the financial institution's wealth management division in a corresponding value block. In further aspects, system 140 may be configured to process each transaction tracked within the particular customer's hybrid blockchain ledger, and may establish a corresponding side chain and value block to track the particular customer's interaction with each distinct pair of source and target lines-of-business. Additionally, in some aspects, system 140 may automatically determine a total value generated by each of the established side chains by reading (or summing) the appended values on the corresponding value blocks (i.e., leaves of the side chains), thus determining values indicative of bonus payouts to employees of the financial institution that generated the side chains, as described below.

In further aspects, system 140 may also execute stored software applications that implement a pruning algorithm at regular frequencies to terminate any duplicate side chains. For example, side-chain creation and maintenance processes consistent with the disclosed embodiments may verify that no other side chain exists for a particular combination of source and target lines-of-business, and additionally or alternatively, may add an address of an existing side chain to allow for proper tracking of all interactions between that customer and a given set of source and target lines-of-business.

The disclosed embodiments, which establish, maintain, and update hybrid blockchain ledger architectures for each customer of a financial institution, and which generate side chains to track values associated with each customer's interaction with various source and target lines of business, may enable system 140 and other devices operating across and enterprise to track and value individual referrals of each customer between the lines-of-business. As the number of customer interactions increase across the lines-of-business, and further, as a number of distinct lines-of-business increase across the enterprise, the computational effort required to track and value interactions involving each customer on corresponding hybrid blockchain ledgers and associated side chains increases, often rendering impractical the tracking of leads from each employee of the enterprise.

In other embodiments, and in view of the computational difficulties related to referral-value tracking described above, system 140 may augment the customer-specific hybrid blockchain ledgers not with corresponding side chains, but with a peer-to-peer transaction block chain that tracks the actual values generated by corresponding referrals between lines-of-business. For instance, an events trigger list incorporated into each customer-specific hybrid blockchain ledger (e.g., event trigger list 322) may identify, as a triggering event, an occurrence of a particular customer activity involving available financial services products or services (e.g., an opening of a line of credit, an acquisition of a mortgage or other debt product, a transfer in management of an investment portfolio to the financial institution, etc.). Further, a rules engine incorporated into each customer-specific hybrid blockchain ledger (e.g., rules engines 324) may include a rule that, in response to the occurrence of the particular customer activity, causes system 140 to generate a new value block in the peer-to-peer transaction block chain to highlight a true value generated by the particular customer activity. The generated value blocks may, in certain aspects, identify not only an actual value resulting from the particular customer activity, but also an employee of the financial institution that initiated a referral resulting in the particular customer activity (e.g., a referral of user 110 from a customer service representative at a branch of the financial institution to a representative of the financial institution's wealth management unit).

In additional or alternate embodiments, system 140 may track value generated by customer interaction with various lines-of-business by generating a hybrid blockchain ledger for each employee of the financial institution or enterprise (e.g., an employee-specific hybrid blockchain ledger). In some aspects, system 140 may identify transactions involving one or more of the employees, and may incorporate data specifying the identifier identified transactions with corresponding ones of the employee-specific hybrid blockchain ledgers using any of the exemplary techniques outlined above. For instance, and in response to a referral involving a particular employee of the financial institution, system 140 may perform operations that generate a new side chain for a corresponding employee-specific hybrid blockchain ledger, which may be updated with appropriate transaction data using any of the exemplary techniques outlined above, and which may be terminated upon an occurrence of a particular customer activity (e.g., an acquisition of a mortgage resulting from the referral, an opening of a credit line in response to the referral, etc.).

Based on event trigger lists and rules engines incorporated into the corresponding customer- and employee-specific hybrid blockchain ledgers, system 140 may generate a new block on a corresponding customer-specific block chain that incorporates data summarizing the activities and interactions within the now-terminated side chain, and that tracks the lead and actual value associated with the corresponding referral. In certain instances, system 140 may format the new block data in a manner appropriate to the individual blockchain transactions described above, and may augment the new block data with a source line-of-business and a lead value of the corresponding referral, along with data identifying, among other things, an employee associated with the particular customer activity (e.g., a loan officer that realized the customer's mortgage, etc.), an actual value resulting from the corresponding referral, and incentive amounts associated with the employees that generated the referral and that realized the activity (e.g., as set forth in the rules engines incorporated into the corresponding customer- and employee-specific hybrid blockchain ledgers).

In additional embodiments, system 140 may execute one or more software application that establish, store, and maintain three hybrid blockchain ledgers that track and value a particular customer's interactions with various lines-of-business of a financial institution in a computationally efficient manner. The three hybrid blockchain ledgers may, in some aspects, include a first hybrid blockchain ledger that tracks the interactions between the particular customer and the various lines-of-business, and a second hybrid blockchain ledger that tracks the activities of a particular employee (e.g., in realizing acquisitions and sales of available financial products, in generating referrals of particular customers across the various lines-of-business, etc.), and a third hybrid blockchain ledger that tracks the interactions between the particular customer and the particular employee.

In one aspect, the first hybrid blockchain ledger may be structured in a manner similar to the customer-specific hybrid blockchain ledgers described above, and system 140 may establish, maintain, and administer the first hybrid blockchain ledger using any of the exemplary techniques described above. In further aspects, system 140 may be configured to augment the transaction data within individual blocks of the first hybrid blockchain ledger (e.g., the exemplary transaction data described above) to include data that identifies an employee who enabled the particular customer activity associated with the transactions (e.g., acquiring a mortgage, transferring management of investment portfolios, opening a line-of-credit, etc.) and additional or alternatively, data that identifies a portal (e.g., a web page, etc.) associated with the particular customer activity. In certain embodiments, and similar to the customer-specific hybrid blockchain ledgers described above, the first hybrid blockchain ledgers may reside identify and track the different touch points of the corresponding customers with the financial institution.

The second hybrid blockchain ledger may, in certain aspects, be structured in a manner similar to the employee-specific hybrid blockchain ledgers described above, and system 140 may establish, maintain, and administer the second hybrid blockchain ledger using any of the exemplary techniques described above. In some instances, and similar to the employee-specific hybrid blockchain ledgers described above, the second hybrid blockchain ledgers may track the interactions between corresponding employee and customers of the financial institution, and individual blocks of the second hybrid blockchain ledgers may identify incentives for referral and bonuses for sales and acquisitions of financial services accounts or products.

In additional aspects, the third hybrid blockchain ledger may mirror the transaction data included within the first and second hybrid blockchain ledgers, and system 140 may establish, maintain, and administer the second hybrid blockchain ledger using any of the exemplary techniques described above. The third hybrid blockchain ledger may, in some aspects, include additional data that tracks a relational nature of the interactions between the particular customer, the particular employee, and the various lines-of-business of the financial institution. Further, system 140 may execute processes that validate the transaction data included within blocks of the first and second hybrid blockchain ledgers using corresponding transaction data within the third hybrid blockchain ledger. By way of example, system 140 may perform the exemplary validation processes described above at regular intervals (e.g., daily, weekly, etc.) or in response to specific events.

IV. Exemplary Processes for Providing Event-Based Rewards Using Hybrid Blockchain Ledgers In the embodiments described above, system 140 may establish, maintain, and administer one or more hybrid blockchain ledger architectures that track customer interactions among various segmented lines-of-business of an enterprise and further, that track occurrences of specific events and activities (i.e., collectively "transactions") that result from the customer interactions. In additional embodiments, system 140 may execute one or more software applications that parse data blocks of the established hybrid blockchain ledgers to identify and extract expected values associated with a customer's interaction with a line of business (e.g., a "lead" value associated with a referral of a customer by one line-of-business to a different line-of-business offering desired product or service), to identity and extract actual values resulting from these customer interactions, and further, to generate or modify portions of the hybrid blockchain ledger to reflect the extracted lead and actual values associated with the customer interactions.

In additional embodiments, the hybrid blockchain ledger architectures described above may enable system 140 to administer, on behalf of an enterprise, programs that reward employees of the enterprise for generating referrals across enterprise's fragmented lines-of-business and further, for certain customer activities, such as purchases or acquisitions of various products and services that result from the generated referrals. For example, and as described above, hybrid blockchain ledger architectures consistent with the disclosed embodiments may include encrypted lists of event triggers (e.g., event trigger list 322) and encrypted rules engines (e.g., rules engine 324). System 140, acting as a Rule authority for the enterprise, may establish and encrypt the event trigger list using a customer-specific cryptographic key (e.g., crypto keys 302A and 302B), and may establish and encrypt the rules engine using an enterprise-specific master key held confidential by system 140 (e.g., master key 301). In certain aspects, system 140's encryption of the event triggers list using the customer-specific cryptographic keys may enable employees of the enterprise to access the encrypted events trigger list (e.g., through software applications executed by corresponding devices) and view the various referrals and customer activities that result in the provision of an award or bonus In an embodiment, the encrypted event trigger list may identify one or more cross-line-of-business referrals that trigger the provision of rewards to employees of the enterprise (e.g., a referral reward). For example, system 140 may establish, through the event triggers list, that a generation of a cross-line-of-business referral by one or more devices within the enterprise (e.g., a device of a customer service representative that refers a customer from a physical branch of a financial institution to the financial institution's commercial banking unit) represents an event that triggers a provision of the referral reward to an employee that generated the referral.

The rules engine may, in certain aspects, associate one or more operations performable by system 140 (e.g., providing referral rewards or bonuses to enterprise employees) with corresponding ones of the trigger events identified within the encrypted event trigger list (e.g., cross-line-of-business referrals). For example, upon detection of a referral of customer by an employee of the enterprise, system 140 may access and decode the encrypted rules engine, parse the decoded rules engine to identify one or more of the operations associated with the detected referral, and further, perform the one or more identified operations to provide an appropriate referral reward to the employee that generated the detected referral.

In additional embodiments, a cross-line-of-business referral may result in a customer's purchase or acquisition of an available product or service (e.g., the customer's acquisition of a commercial line-of-credit from the financial institution). In some aspects, system 140 may, through the event trigger list, establish that the customer's referral-driven purchase or acquisition represents and event that triggers a provision of a reward (e.g., a sales reward) to an employee that realized the purchase or acquisition and additionally or alternatively, a provision of an additional reward (e.g., an referral reward) to the employee that generated the referral. Further, by way of example, and upon detection of the customer's referral-driven purchase or acquisition, system 140 may access and decode the encrypted rules engine, parse the decoded rules engine to identify one or more of the operations associated with the detected purchase or acquisition, and further, perform the one or more identified operations to provide an appropriate sales reward to the employee that realized the purchase or acquisition, and additionally or alternatively, an appropriate referral reward to the employee that generated the referral resulting in the purchase or acquisition.

The decoded rules engine may also include correlation data that, in certain aspects, maps characteristics of detected referrals and/or customer activities (i.e., purchases or acquisitions of available products) to appropriate types and values of referral and/or sales rewards. For instance, in response to the detected referral and/or detected customer activity, system 140 may perform operations that parse one or more blocks of the hybrid blockchain legers described above (and additionally or alternatively, blocks of corresponding side chains) to identify and extract one or more characteristics of the detected referrals and/or customer activities.

By way of example, characteristics of a detected referral may include, but are not limited to, a time stamp of the detected referral, source and target lines-of-business associated with the detected referral, data identifying a device that generated the detected referral (e.g., a MAC address, IP Address, etc.), an employee that initiated the detected referral, a lead value associated with the detected referral, and a potential customer activity associated with the detected referral. Further, in some instances, characteristics of a detected purchase or acquisition (i.e., that results from a prior detected referral) may include, but are not limited to, a time stamp of the detected purchase or acquisition, source and target lines-of-business associated with the detected purchase or acquisition, data identifying a device that generated the realized purchase or acquisition (e.g., a MAC address, IP Address, etc.), an employee that initiated the realized purchase or acquisition, an actual value of the realized purchase or acquisition, data identifying the realized purchase or acquisition, and any of the characteristics of the detected referral from which the realized purchase or acquisition results.

System 140 may, in certain instances, compare one or more of the extracted characteristics of the detected referral and/or the detected activity with the accessed correlation data to determine an appropriate referral reward and/or sales award. In certain aspects, the determined referral reward and/or sales award may include a financial benefit, and a value of the financial benefit may be specified by the accessed correlation data. The financial benefit may be a cash award (e.g., provided by system 140 to an employee during a coming pay period) and additionally or alternatively, may include a cash equivalent, such as a prepaid or gift card. In other aspects, however, the determined referral reward and/or sales award may include a non-financial benefit, which may include, but is not limited to, a transit benefit or pass, a reduction in a monthly parking fee, a fee reduction or credit on a monthly gym membership, and any additional or alternate non-financial benefit accessible to system 140 for provision or assignment to one or more employees of an enterprise.

By way of example, a reward type (e.g., a financial or non-financial benefit) and/or the value characterizing the reward may be specified for a particular combination of detected referral and/or detected activity characteristics by the enterprise or financial institution, e.g., in conformity with one or more business and/or employment practices of the enterprise. In other instances, an assignment of specific types and/or values of rewards to particular combinations of detected referral and/or detected activity characteristics may conform to one or more regulatory or policy-based restrictions imposed on the enterprise by a governmental entity.

In some embodiments, and upon determination of the appropriate referral reward and/or sales award, system 140 may perform operations (e.g., as set forth in the accessed rules engine) that provide the appropriate sales reward to the employee that realized the detected activity and additionally or alternatively, that provide the appropriate referral reward to the employee that generated the detected activity (e.g., in step 416 of FIG. 4). The accessed rules engine may, in certain aspects, set forth multiple, distinct sets of operations that provide appropriate sales and/or referral rewards to various employees. By way of example, system may be configured to perform the multiple distinct operations, which establish corresponding reward calculation engines, and the provided referral and/or sales rewards may be tracked within corresponding one or more blockchain data structures using any of the exemplary techniques outlined above, In some aspects, system 140 may perform operations that initiate an electronic transfer of funds consistent with a financial benefit to an account of the corresponding employee. In other aspects, and through a corresponding API call to one or more external computer systems, system 140 may perform operations that generate and/or provide a non-cash award to the corresponding employee. For example, system 140 may execute software applications that, through a corresponding API call to a computer system of the e-commerce retailer (e.g., Amazon.com™, etc.), generate and deliver to the corresponding employee (e.g., through an appropriate email address) a pre-paid digital gift card loaded with a balance consistent with the financial award.

Additionally or alternatively, system 140 may perform operations that generate and/or provide a non-financial benefit to the corresponding employee. For example, system 140 may execute software applications that, through a corresponding API call to a computer system associated with a local transit authority (e.g., the Toronto Transit Commission™ or the WMATA™), generate and deliver to the corresponding employee a transmit benefit consistent with the non-financial referral or sales award. The disclosed embodiments are, however, not limited to these exemplary operations, and in other systems, system 140 may perform any additional or alternate operations to generate and deliver financial and non-financial referral and/or sales rewards that would be appropriate to the enterprise and the corresponding rewards.

By way of example, and as described above, a customer of a financial institution may consider transferring management of a portion of an investment portfolio (e.g., valued at $400,000) to a wealth management unit of the financial institution. In certain aspects, a customer service representative of the financial institution may refer the customer to a financial services representative of the wealth management unit, and a device of the customer service representative (e.g., client device 106) may execute software applications (e.g., a mobile application or plug-in provided by system 140) that establish the appropriate referral based on data input by the customer service representative.

For example, the referral data may include, but is not limited to, the customer's name, a description of the product or service (e.g., wealth management services), an identity of the target line-of-business (e.g., the wealth management unit), an identity of the customer service representative and the generating device, and a lead value of the referral (e.g., a transfer of a portfolio valued at $400,000). In some aspects, client device 106 may transmit the referral data to system 140 using any of the communications protocols outlined above, along with additional data that includes, but is not limited to, information identifying a source of the referrals (i.e., the customer service representative at the branch), information identifying client device 106 (e.g., a MAC address or IP address), and time stamps for the referrals. In further aspects, system 140 may execute software applications that include portions of the received referral data as corresponding "transactions" in blocks of one or more hybrid blockchain ledger architectures, using any of the exemplary techniques described above.

Additionally, and in one aspect, a device held by the financial services representative of the wealth management unit (i.e., the target line-of-business of the customer service representative's referral) may capture information indicative of the customer's activities in response to the referrals. For instance, and in response to the customer service representative's referral, the customer may schedule an appointment with the representative of the wealth management unit (e.g., using any of the processes described above), and after discussing the wealth management services offered by the financial institution, the customer may elect to transfer management of a larger portion of the investment portfolio to the financial institution (e.g., a portion of the portfolio valued at $1,000,000, as opposed to the lead value of $400,000). In certain aspects, a device of the financial service representative that realized the customer activity (e.g., the transfer of management of the $1,000,000 portfolio) may capture data indicative of the customer's realized activity based on data input by the financial services representative (e.g., data input into a graphical user interface (GUI) presented by an executed application).

For example, the customer activity data may include, but is not limited to, the customer's name, a time stamp of the realized activity, a description of the activity (e.g., transfer of portfolio management), an identity of the source line-of-business (e.g., the wealth management unit), an identity of the financial services representative and the realizing device, a lead value of the referral (e.g., a potential transfer of a portfolio valued at $400,000), and an actual value of the activity resulting from the referral (e.g., an actual transfer of a portfolio valued at $1,000,000). In some aspects, the device of the financial services representative may transmit the activity data to system 140 using any of the communications protocols outlined above. In further aspects, system 140 may execute software applications that include portions of the received referral data as corresponding "transactions" in blocks of one or more hybrid blockchain ledger architectures, using any of the exemplary techniques described above.

In certain aspects, and using any of the exemplary techniques described above, system 140 may execute software applications that parse blocks of one or more of the generated hybrid blockchain ledgers to generate and record lead and/or actual values associated with the customer's referral from the branch to the wealth management unit (e.g., the lead value of $400,000) and with the customer activity resulting from the referral (e.g., the actual value of $1,000,000). Further, and as described below in reference to FIG. 6, system 140 may determine that the customer referral and/or the resulting customer activity represents an event triggering disbursement of one or more referral and/or sales rewards to employees of the financial institution, and system 140 may perform operations that provide the referral and/or sales rewards to appropriate employees of the enterprise.

Figure 6:
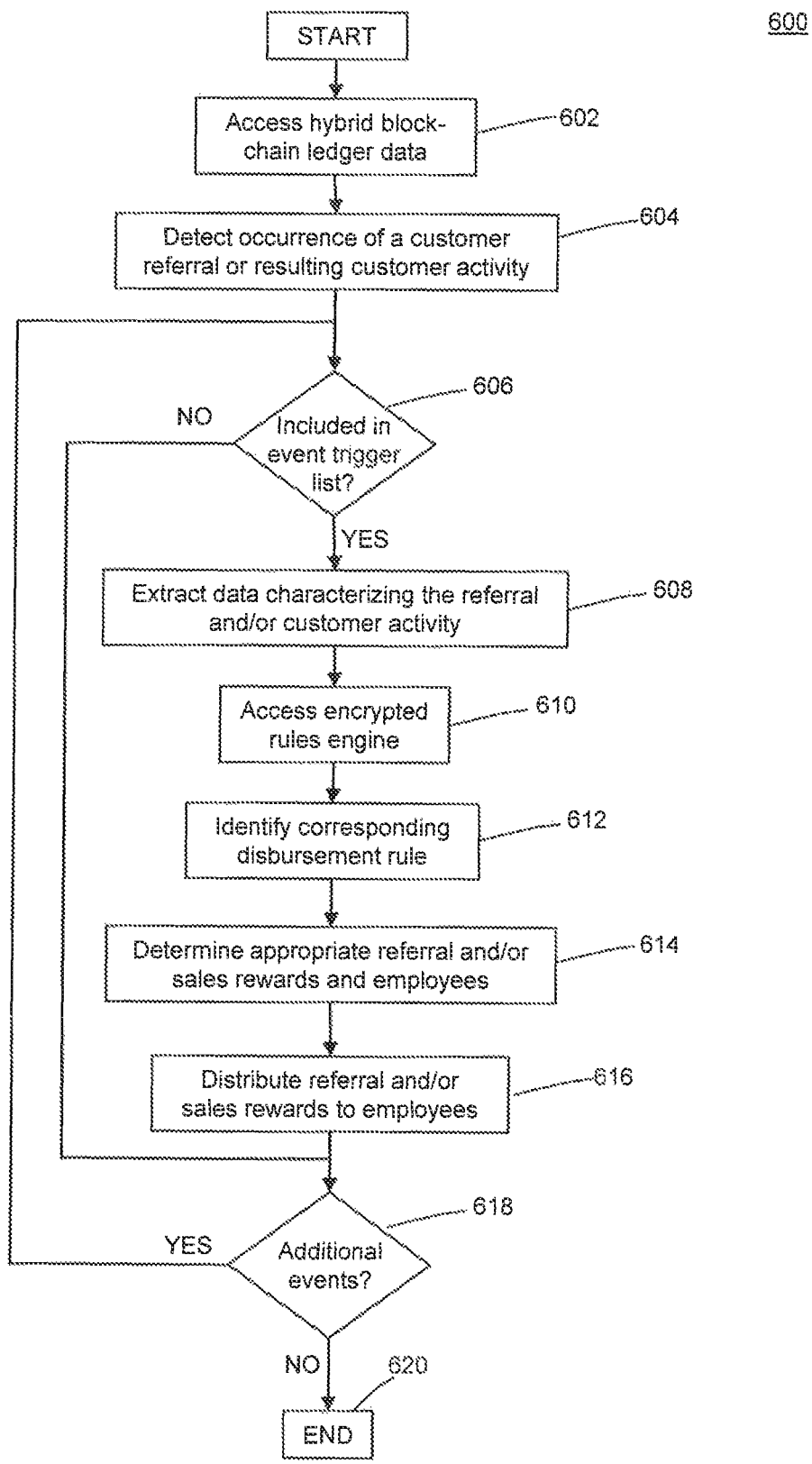
FIG. 6 is a flowchart of an exemplary process for performing operations in response to events tracked within a hybrid blockchain ledger, consistent with the disclosed embodiments.

FIG. 6 is a flowchart of an exemplary process 600 for automatically performing operations in response to events tracked within a hybrid blockchain ledger, in accordance with disclosed embodiments. In an embodiment, computer system associated with a rules authority of an enterprise (e.g., system 140 associated with business entity 150) may establish and maintain one or more hybrid blockchain ledgers (and additionally or alternatively, one or more corresponding side chains) that track customer referrals across fragmented lines-of-business and customer activities that result from the customer referrals. In some aspects, system 140 may execute software instructions to determine that one or more of the tracked referrals and customer activities correspond to an event requiring disbursement of rewards to employees of the enterprise, and further, to perform operations that provide the rewards to the employees.

In certain aspects, system 140 may execute software applications that access data corresponding to one or more stored hybrid blockchain ledgers (e.g., in step 602), and further, that parse discrete blocks of the accessed hybrid blockchain ledger data to identify an occurrence of a customer referral and/or an occurrence of customer activity resulting from the customer referral (e.g., in step 604). By way of example, system 140 may establish and maintain the one or more hybrid blockchain ledgers using any of the exemplary techniques described above, and may store the data corresponding to the established and maintained hybrid blockchain ledgers in a portion of a locally accessible data repository (e.g., data repository 144) and additionally or alternatively, within a data repository accessible to system 140 across network 120 (e.g., network accessible cloud-based storage).

For example, and using any of the exemplary techniques described above, system 140 may identify, within at least one of the hybrid blockchain ledgers, data indicative of the transfer of management of the customer's investment portfolio to the wealth management unit of the financial institution and further, data indicative of the referral of the customer from the branch of the financial institution to the wealth management unit, which resulted in the identified transfer. In some aspects, system 140 may access the stored list of triggering events (e.g., within database 144), and in step 606, may determine whether the list of triggering events includes the identified customer activity (e.g., the transfer of the management of the customer's investment portfolio) and/or the identified referral, which resulting in the transfer. If system 140 were to identify the identified customer activities and/or customer referral within the list of triggering events (e.g., step 606; YES), system 140 may further process the hybrid blockchain ledger data to extract data characterizing the identified customer activities and/or the customer referral (e.g., in step 608).

For example, and as described above, system 140 may determine that the identified customer activity and customer referral represent events triggering a disbursement of referral and/or sales rewards. Further, and using any of the exemplary techniques described above, system 140 may extract, from the accessed hybrid blockchain ledger data, additional data that characterizes the customer referral and the resulting customer activity. For example, as described above, the extracted characteristic data may include, but is not limited to, data identifying the customer service representative that generated the customer referral, the lead value associated with the referral (e.g., the potential value of $400,000), data identifying the financial services representative that realized the portfolio transfer, the actual value of the transferred portfolio (e.g., the actual value of $1,000,000), and time stamps of the customer referral and the realized transfer.

In additional aspects, system 140 may decrypt and access the encrypted rules engine in step 610 (e.g., using the master encryption key), and further, may identify at least one of the rules specifying a disbursement of referral and/or sales rewards that corresponds to the identified customer referral and the realized customer activity (e.g., in step 612). Based on the at least one identified disbursement rule, and a comparison of the extracted characteristic data and correlation data included within the decrypted rules engine, system 140 may determine at least one referral reward and at least one sales reward appropriate to the identified customer referral and resulting customer activity (e.g., in step 614).

For instance, system 140 may determine that the financial services representative that realized the transfer of the customer's investment portfolio should receive a sales reward of $200, and that the customer service representative of the branch location should receive a prepaid gift card (e.g., a Starbucks™ card or an Amazon.com™ card) loaded with $50 in funds. The disclosed embodiments are, however, not limited to these exemplary rewards, and in additional embodiments, system 140 may determine the provide any additional or alternate financial or non-financial benefit to the customer and financial service representatives that would be consistent with the disbursement rules and appropriate to the financial institution.

System 140 may, in step 616, perform operations that automatically distribute the determined referral and/or sales rewards to corresponding employees of the enterprise. In certain aspects, system 140 may perform the distribution of the determined referral and/or sales rewards automatically and without input from the customer service representative and/or the financial services representative. For example, and as described above, system 140 may perform operations that initiate an electronic transfer of $200 (e.g., the sales reward determined in step 612, above) to an financial services account held by the financial services representative at the financial institution or at other financial institutions. Additionally, and as described above, system 140 may execute software applications that, through a corresponding API call to a computer system of the e-commerce retailer (e.g., Starbucks™, Amazon.com™, etc.), generate and deliver to the customer service representative (e.g., through an appropriate email address) a pre-paid digital gift card loaded with the referral reward of $50. The disclosed embodiments are not limited to these exemplary distribution processes, and in additional embodiments, system 140 may perform any additional or alternate operations capable of obtaining and distributing financial and/or non-financial benefits to corresponding employees that are appropriate to the financial institution.

Further, although described in terms of processes that automatically distribute rewards without employee input, the disclosed embodiments are not limited to these exemplary distribution processes. In further embodiments, system 140 may determine that a number of candidate referral and sales rewards are appropriate to the identified customer referral and resulting customer activity (e.g., in steps 612 and 614), and may perform operations that transmit data indicative of the multiple candidate referral and sales rewards to corresponding devices held by the customer service representative and financial service representative (e.g., across network 120 using any of the exemplary communications protocols outlined above).

In certain aspects, the transmitted data may cause the customer service representative's device to present the candidate referral rewards to the customer service representative, and the customer service representative may provide input to the device selecting one or the candidate referral rewards for provision by system 140. Similarly, in some aspects, the provided data may cause the financial service representative's device to present the candidate sales rewards to the financial service representative, and the financial service representative may provide input to the device selecting one or the candidate sales rewards for provision by system 140. The devices may transmit the selected candidate referral and sales rewards to system 140, which may perform operations consistent with those described above to provision the selected referral and sales rewards to candidate ones of the customer service representative and financial service representative (e.g., in step 614).

In step 618, system 140 may further parse the hybrid blockchain ledger data to determine whether additional events (e.g., referrals, resulting activities, etc.) require analysis. If system 140 were to determine that no further events require analysis (e.g., step 616; NO), exemplary process 600 is then complete in step 620. If, however, system 140 were to identify additional referrals and/or resulting customer activities (e.g., step 618; YES), exemplary process 600 may pass back to step 606, and system 140 may determine whether the additional referrals and/or resulting customer activities are included in the event trigger list, as described above.

Further, if system 140 were to determine that the list of triggering events fails to include the identified customer referral or the identified customer activity (e.g., step 606; NO), exemplary process may pass forward to step 616, and system 140 may determine whether additional events require analysis, as described above.

In the embodiments described above, system 140 may establish and maintain hybrid blockchain ledger architectures that detect and track occurrences of specific events and/or transactions (e.g., customer referrals and resulting customer activity) across the enterprise and further, that distribute various employee rewards based on the detected and racked occurrences. As described above, the disclosed embodiments may perform operations to disburse one or more of these rewards when a corresponding one of the customer referral and/or resulting customer activity represents a triggering event (e.g., and included within an event trigger list maintained in the hybrid blockchain ledgers, as described above).

The disclosed embodiments are, however, not limited to processes that distribute rewards based on a presence of a single triggering event within the hybrid blockchain ledgers maintained by system 140. In additional embodiments, the event trigger lists incorporated into these maintained hybrid blockchain ledgers may specify multiple triggering events that upon detection by system 140, cause system 140 to perform operations to disburse one or more rewards to corresponding employees in accordance with the rules engine, as described above. For example, the multiple trigger events may include, but are not limited to, a certain transaction value, sale, customer interaction, a referral, and/or a combination thereof.

Additionally, in certain disclosed embodiments, system 140 acts as a rules authority for the enterprise (e.g., the financial institution) and further, establishes and maintains one or more the hybrid blockchain data structures and corresponding side chains, as described above. In other embodiments, however, the employee devices that capture referral data and/or realized customer activities may also be configured (e.g., by executed software applications provided by system 140) to provide the captured data to one or more of peer systems 160. Peer systems 160 may, in some aspects, act as "miners" for hybrid blockchain ledgers consistent with the disclosed embodiments. For example, using any of the exemplary techniques outlined above, peer systems 160 may competitively process the received transaction data (either alone or in conjunction with other data) to generate additional ledger blocks, which may be appended to the hybrid blockchain ledgers and/or side chains and distributed across peer systems 160 (e.g., through a peer-to-peer network) and to other connected devices of environment 100 (e.g., across network 120).

Systems and processes consistent with the disclosed embodiments may, in some aspects, integrate all communication channels into a single tracking system, and provides a platform upon which referrals can be monetized. These exemplary systems and processes can further increase the value proposition for each customer going through this interaction. Thus, disclosed embodiments this exhibit advantages over existing systems which leverage conventional blockchain ledgers.

The exemplary hybrid blockchain ledgers described above can further be augmented by allowing for incentives and payouts to occur in the transaction allowing for direct justification of the payouts. The augmentation would reduce the need to maintain records of all transaction, referrals and sales as it would be integrated into a single location in the hybrid blockchain ledgers.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
at least one processor; and
a non-transitory memory storing executable instructions that, when executed by the at least one processor, causes the at least one processor to perform the steps of:
accessing data maintained within a first block of a blockchain ledger, and determining an occurrence of an event based on the accessed data, the first block corresponding to a current owner of an asset, the current owner being associated with a first private cryptographic key;
based on determining the occurrence of the event:
decrypting an encrypted first portion of the accessed data using a master cryptographic key associated with a rules authority, the decrypted first portion identifying a plurality of rules associated with the rules authority;
decrypting an encrypted second portion of the accessed data using a second private cryptographic key associated with a previous owner of the asset, the decrypted second portion of the accessed data identifying a plurality of triggering events, and the blockchain ledger comprising a second block that corresponds to the previous owner;
determining that the event corresponds to at least one of the triggering events; and
when the event corresponds to the at least one of the triggering events, identifying at least one of the plurality of rules that exhibits a relationship with the event; and
performing operations consistent with the at least one of the plurality of rules, the operations comprising:
generating a third block of the blockchain ledger, the third block corresponding to a future owner associated with a third private cryptographic key, and the third block including: (i) the encrypted first portion of the accessed data that is modified for the future owner, (ii) the encrypted second portion of the accessed data that is modified for the future owner, and (iii) event data associated with the determined occurrence of the event, the encrypted second portion of the accessed data being encrypted with the first private cryptographic key of the current owner; and
transmitting the third block to one or more peer systems, the one or more peer systems being configured to record the third block onto the blockchain ledger.

2. The apparatus of claim 1, wherein the first private cryptographic key is associated with the event.

3. The apparatus of claim 1, wherein the executed instructions further cause the at least one processor to perform the steps of storing the third block within a secure data repository.

4. The apparatus of claim 3, wherein the executed instructions further cause the at least one processor to perform the steps of:
generating the master cryptographic key;
storing the generated master cryptographic key in a portion of the secure data repository; and
establishing at least one access permission for the stored master cryptographic key.

5. The apparatus of claim 1, wherein the executed instructions further cause the at least one processor to perform the steps of:
obtaining trigger-event data identifying one or more candidate triggering events;
encrypting the trigger-event data and transmitting the encrypted trigger-event data to one or more peer systems, the one or more peer systems being configured to record the encrypted trigger-event data onto the blockchain ledger.

6. The apparatus of claim 1, wherein the executed instructions further cause the at least one processor to perform the steps of:
obtaining rules data specifying one or more candidate rules established by the rules authority;
encrypting the rules data using the master cryptographic key; and
transmitting the encrypted rules data to one or more peer systems, the one or more peer systems being configured to record the encrypted rules data onto the blockchain ledger.

7. The apparatus of claim 1, wherein:
the event comprises at least one of a referral of a customer from a first line-of-business of an enterprise to a second line-of-business of the enterprise or an activity of the customer involving the second line-of-business;
the at least one rule specifies at least one of a referral reward or a sales reward corresponding to the detected event, the at least one of the referral reward or sales award being associated with a reward type or value;
the first private cryptographic key is associated with a device associated with the current owner, wherein the current owner is at least one of a customer, a first employee of the first line-of- business, or a second employee of the second line-of-business; and
the executed instructions further cause the at least one processor to perform additional operations that initiate a disbursement of at least one of the referral reward to the first employee or the sales reward to the second employee.

8. The apparatus of claim 7, wherein the executed instructions further cause the at least one processor to perform the steps of:

based on the determined occurrence of the event, decrypting an encrypted third portion of the accessed data using the first private cryptographic key, the decrypted third portion of the accessed data comprising correlation data that maps one or more characteristics of the event to the reward type or value;

extracting information specifying the one or more event characteristics from the accessed data;

determining the reward type or value based on a comparison of at least a portion of the correlation data and the extracted information; and initiating the disbursement of the at least one referral or sales reward in accordance with the determined at least one reward type or value.

9. A computer-implemented method, comprising:

accessing, using at least one processor, data maintained within a first block of a blockchain ledger, and determining an occurrence of an event based on the accessed data, the first block corresponding to a current owner of an asset, the current owner being associated with a first private cryptographic key;

based on determining the occurrence of the event:

decrypting, using the at least one processor, an encrypted first portion of the accessed data using a master cryptographic key associated with a rules authority, the decrypted first portion identifying a plurality of rules associated with the rules authority;

decrypting, using the at least one processor, an encrypted second portion of the accessed data using a second private cryptographic key associated with a previous owner of the asset, the decrypted second portion of the accessed data identifying a plurality of triggering events, and the blockchain ledger comprising a second block that corresponds to the previous owner;

determining, using the at least one processor, that the event corresponds to at least one of the triggering events; and when the event corresponds to the at least one of the triggering events, identifying at least one of the plurality of rules that exhibits a relationship with the event and using the at least one processor, performing operations consistent with the at least one of the plurality of rules, the operations comprising:

generating a third block of the blockchain ledger, the third block corresponding to a future owner associated with a third private cryptographic key, the third block including: (i) the encrypted first portion of the accessed data that is modified for the future owner, (ii) the encrypted second portion of the accessed data that is modified for the future owner, and (iii) event data associated with the determined occurrence of the event, the encrypted second portion of the accessed data being encrypted with the first cryptographic private key of the current owner; and transmitting the third block to one or more peer systems, the one or more peer systems being configured to record the third block onto the blockchain ledger.

10. The computer-implemented method of claim 9, further comprising storing the third block within a secure data repository.

11. The computer-implemented method of claim 10, further comprising:

generating the master cryptographic key;

storing the generated master cryptographic key in a portion of the secure data repository; and establishing at least one access permission for the stored master cryptographic key.

12. The computer-implemented method of claim 9, further comprising:

obtaining trigger-event data identifying one or more candidate triggering events;

encrypting the trigger-event data and transmitting the encrypted trigger-event data to one or more peer systems, the one or more peer systems being configured to record the encrypted trigger-event data onto the blockchain ledger.

13. The computer-implemented method of claim 9, further comprising:

obtaining rules data specifying one or more candidate rules established by the rules authority;

encrypting the rules data using the master cryptographic key; and transmitting the encrypted rules data to one or more peer systems, the one or more peer systems being configured to record the encrypted rules data onto the blockchain ledger.

14. The computer-implemented method of claim 9, wherein:

the event comprises at least one of a referral of a customer from a first line-of-business of an enterprise to a second line-of-business of the enterprise or an activity of the customer involving the second line- of-business;

the at least one rule specifies at least one of a referral reward or a sales reward corresponding to the detected event, the at least one of the referral reward or sales award being associated with a reward type or value;

the first private cryptographic key is associated with a device associated with the current owner, wherein the current owner is at least one of a customer, a first employee of the first line-of-business, or a second employee of the second line-of-business; and the method further comprises performing additional operations that initiate a disbursement of at least one of the referral reward to the first employee or the sales reward to the second employee.

15. A tangible, non-transitory computer-readable medium storing instructions that, when executed by at least one processor, perform a method comprising:

accessing data maintained within a first block of a blockchain ledger, the first block corresponding to a current owner of an asset, the current owner associated with a first private cryptographic key, and determining an occurrence of an event based on the accessed data;

based on determining the occurrence of the event:

decrypting an encrypted first portion of the accessed data using a master cryptographic key associated with a rules authority, the decrypted first portion identifying a plurality of rules associated with the rules authority;

decrypting an encrypted second portion of the accessed data using a second private cryptographic key associated with a previous owner of the asset, the decrypted second portion of the accessed data identifying a plurality of triggering events and the blockchain ledger comprises a second block that corresponds to the previous owner;
determining that the event corresponds to at least one of the triggering events; and
when the event corresponds to the at least one of the triggering events, identifying at least one of the plurality of rules that exhibits a relationship with the event; and
performing operations consistent with the at least one of the plurality of rules, the operations comprising:
generating a third block of the blockchain ledger, the third block corresponding to a future owner associated with a third private cryptographic key, the third block including: (i) the encrypted first portion of the accessed data that is modified for the future owner, (ii) the encrypted second portion of the accessed data that is modified for the future owner, and (iii) event data associated with the determined occurrence of the event, the encrypted second portion of the accessed data being encrypted with the first private cryptographic key of the current owner; and
transmitting the third block to one or more peer systems, the one or more peer systems being configured to record the third block onto the blockchain ledger.

16. The apparatus of claim 1, wherein the at least one of the triggering events comprises a loss of the first private cryptographic key, and wherein the executed instructions further cause the at least one processor to perform the steps of:
determining that the event corresponds to the loss of the first private cryptographic key; and
when the event corresponds to the loss of the first private cryptographic key, identifying the at least one of the plurality of rules that exhibits a relationship with the loss of the first private cryptographic key, the at least one of the plurality of rules being associated with a generation of a new private cryptographic key; and
performing additional operations consistent with the at least one of the plurality of rules, the additional operations comprising generating the new private cryptographic key.

17. The apparatus of claim 16, wherein:
the at least one of the triggering events comprises the loss of the first private cryptographic key by the-current owner; and
the additional operations further comprise transmitting the new private cryptographic key to a device of the current owner.

18. The apparatus of claim 16, wherein the additional operations further comprise:
generating a further element of the blockchain ledger that includes the new private cryptographic key; and
transmitting the further element to the one or more peer systems, the one or more peer systems being configured to record the further element onto the blockchain ledger.

19. The apparatus of claim 1, wherein the executed instructions further cause the at least one processor to perform the steps of:
modifying the decrypted first portion of the accessed data, the modified first portion comprising a modification to at least one of the plurality of rules;
encrypting the modified first portion using the master cryptographic key;
generating a further element of the blockchain ledger that includes the encrypted modified first portion and the encrypted second portion of the accessed data; and
transmitting the further element to the one or more peer systems, the one or more peer systems being configured to record the further element onto the blockchain ledger.

* * * * *